United States Patent [19]

Patterson et al.

[11] 4,006,466
[45] Feb. 1, 1977

[54] PROGRAMMABLE INTERFACE APPARATUS AND METHOD

[75] Inventors: Garvin Wesley Patterson, Glendale; William A. Shelly, Phoenix; Jaime Calle, Glendale; Earnest M. Monahan, Phoenix, all of Ariz.

[73] Assignee: Honeywell Information Systems, Inc., Waltham, Mass.

[22] Filed: Mar. 26, 1975

[21] Appl. No.: 562,364

[52] U.S. Cl. .......................................... 340/172.5
[51] Int. Cl.[2] .......................................... G06F 1/00
[58] Field of Search .................................. 340/172.5

[56] References Cited

UNITED STATES PATENTS

| | | | |
|---|---|---|---|
| 3,386,083 | 5/1968 | Geller et al. | 340/172.5 |
| 3,399,384 | 8/1968 | Crockett et al. | 340/172.5 |
| 3,905,025 | 9/1975 | Davis et al. | 340/172.5 |
| 3,925,766 | 12/1975 | Bardotti et al. | 340/172.5 |

*Primary Examiner*—R. Stephen Dildine, Jr.
*Attorney, Agent, or Firm*—Faith F. Driscoll; Ronald T. Reiling

[57] ABSTRACT

An input/output data processing system includes a plurality of active modules, a plurality of passive modules and at least one memory module and a system interface unit having a plurality of ports, each of which connect to a different one of the modules. Each module connects to one of the ports by a plurality of different interfaces. The active modules include an input/output processing unit for processing interrupts and executing command sequences and a multiplexer unit for directly controlling transfers between the memory module and any one of the peripheral devices coupled to different ones of a plurality of ports of the multiplexer unit. Different ones of the modules of the system include the programmable interface used for transferring command information to the multiplexer unit and to the devices associated therewith for enabling a different type of control to proceed in parallel with input/output data transfer operations. Each multiplexer unit includes a plurality of storage registers which are operatively coupled to the programmable interface associated therewith for receiving control information therefrom designating the priority to be given by the unit to the processing of different types of interrupt signals received from devices associated therewith in addition to information designating which one of a set of processing routines to be used in servicing the interrupt.

24 Claims, 31 Drawing Figures

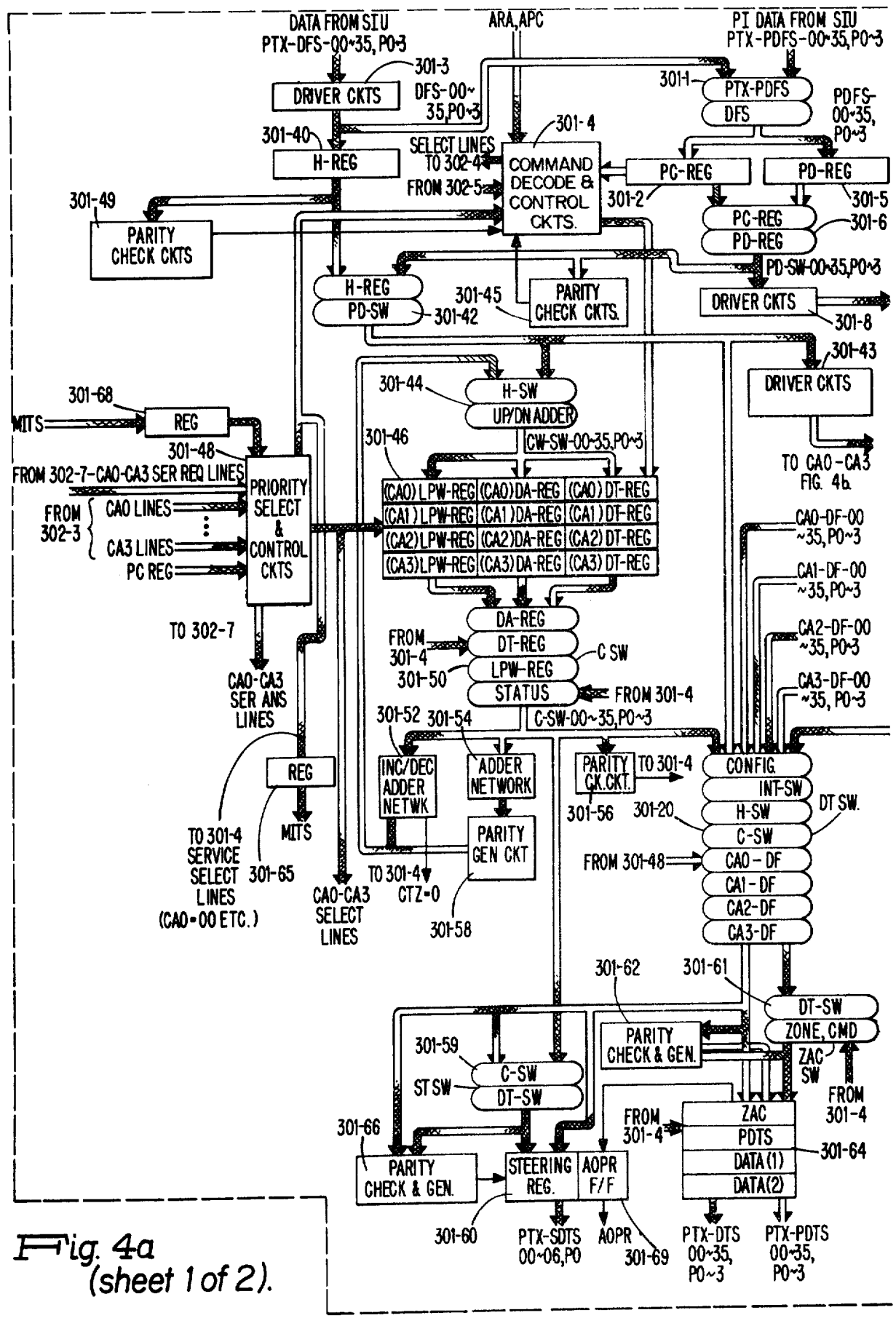
Fig. 4a (sheet 1 of 2).

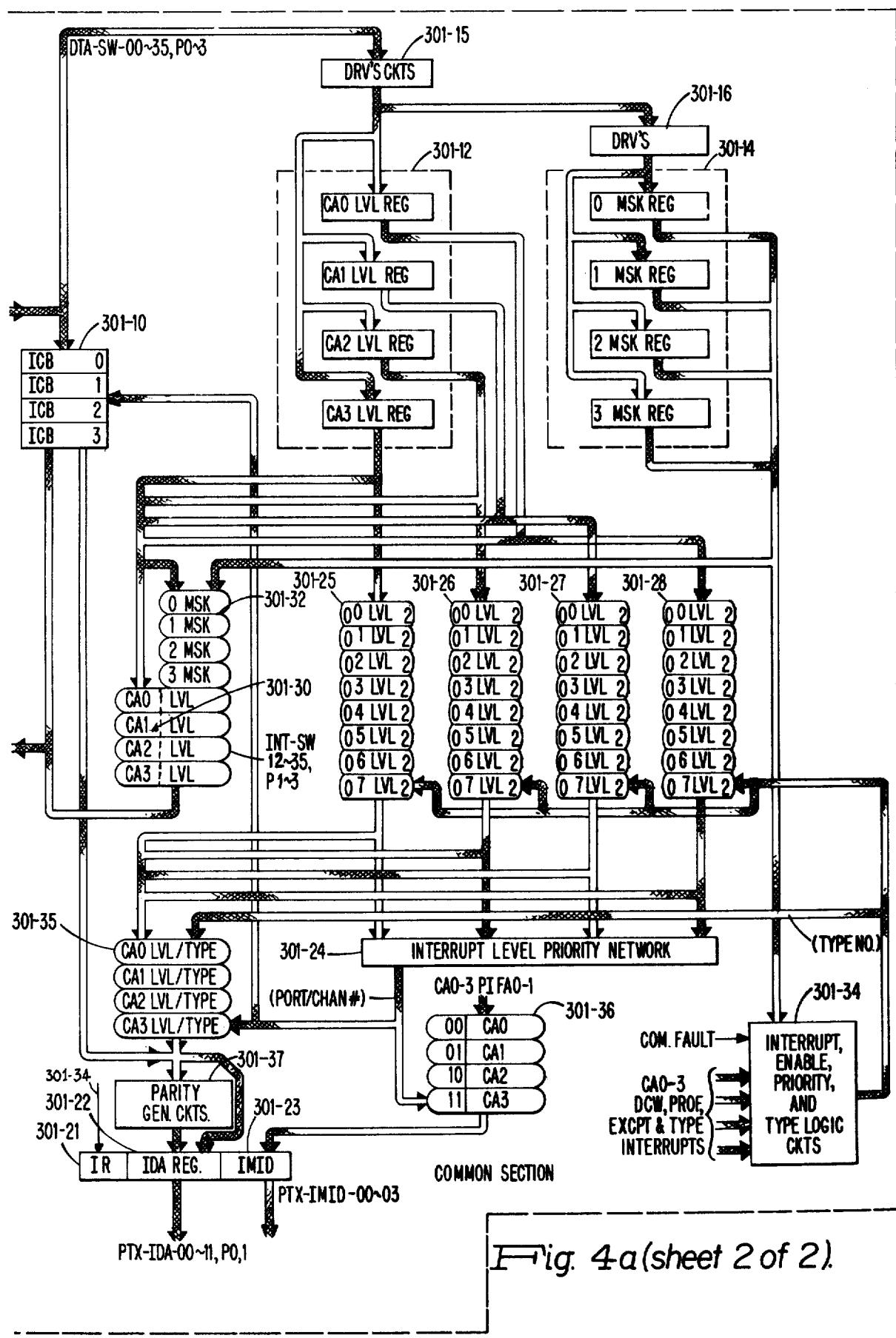
Fig. 4a (sheet 2 of 2).

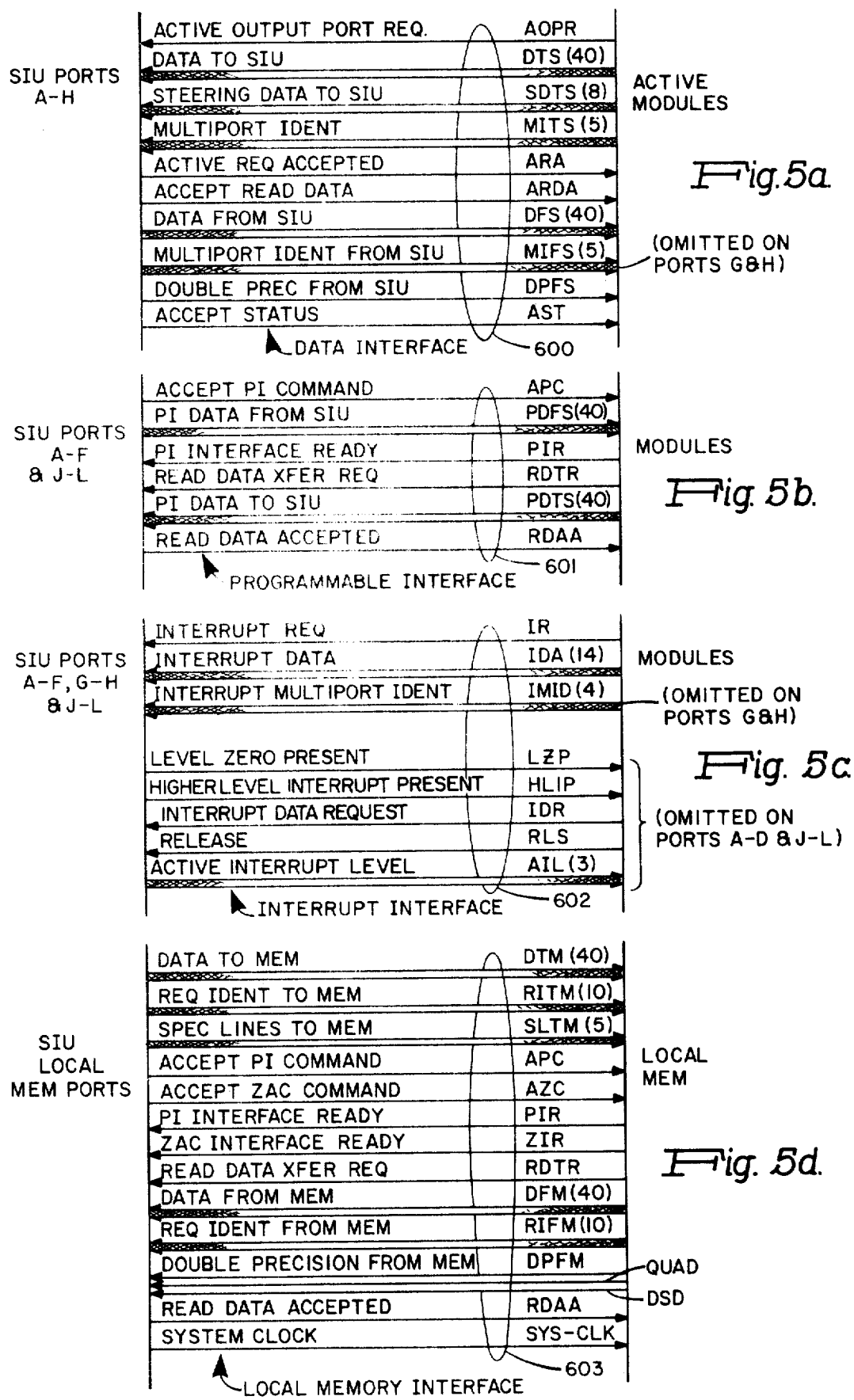

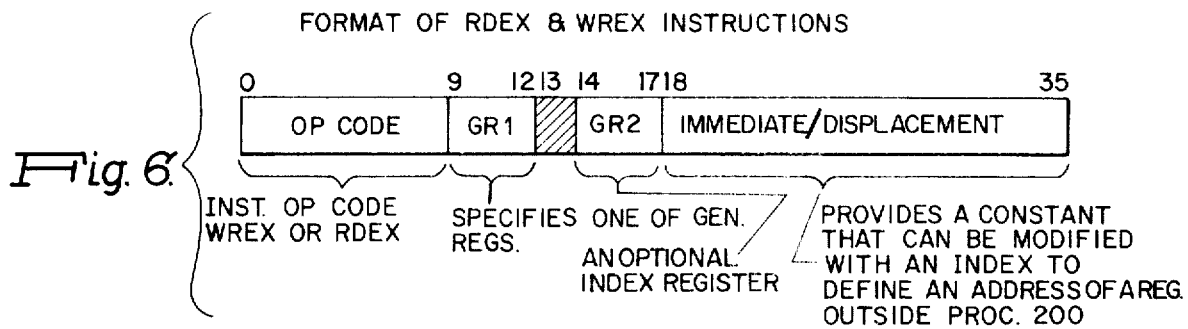
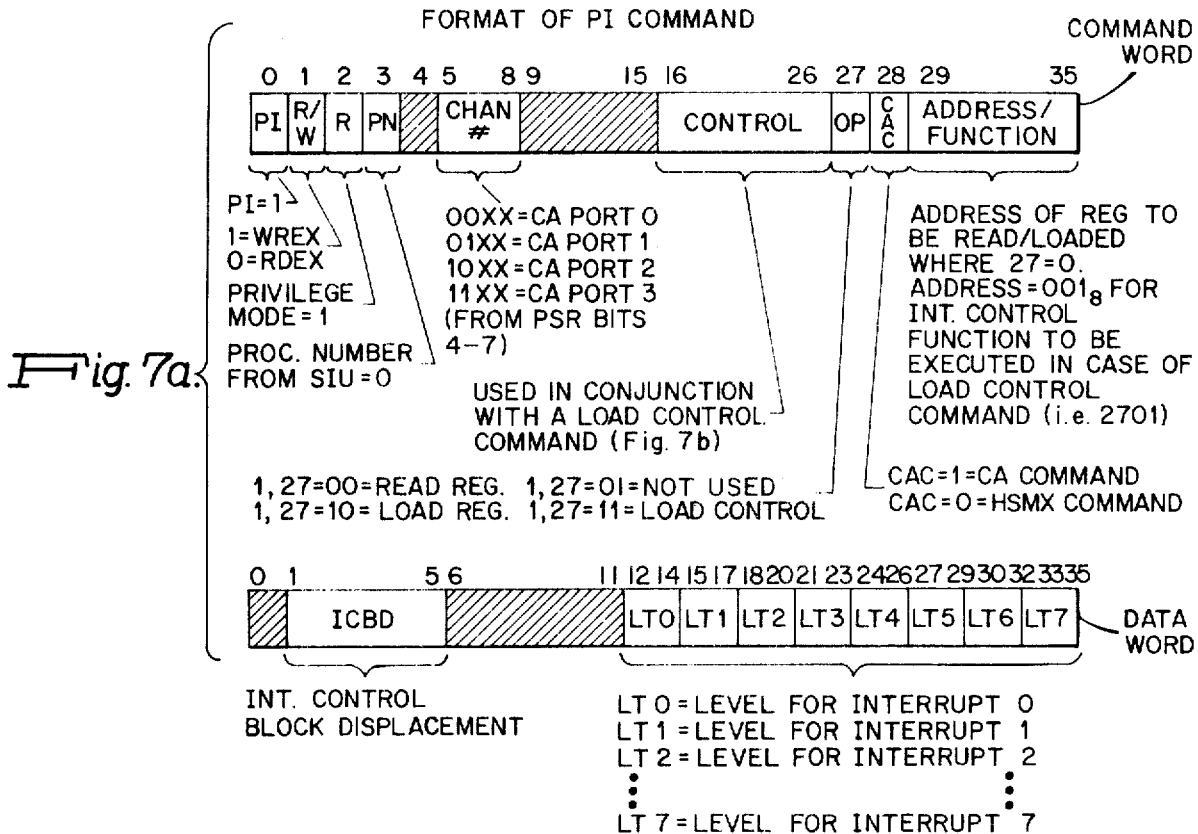
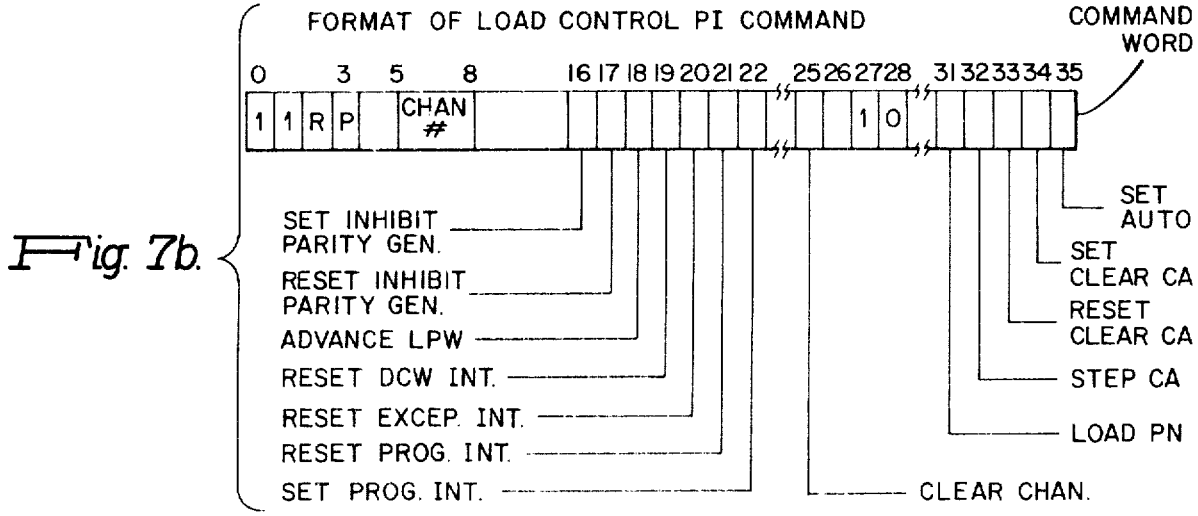

| | DATA WORD | | | | | REG # |
|---|---|---|---|---|---|---|
| | 0 | 9 | 18 | 27 | 35 | OCTAL |
| INTERRUPT MASKS | | | | | INT. MASKS | *000 |
| INTERRUPT CONTROL | ⊠ ICBD | | LT0 LT1 LT2 LT3 | LT4 LT5 LT6 LT7 | | *001 |
| DATA TALLY/CONTROL | DATA CONTROL | | | DATA TALLY | | *003 |
| DATA ADDRESS | DATA ADDRESS | | | | | *007 |
| LPW | LPW | | | | | *013 |
| CHNL-D-REG-0 | CH-D0 | | | | | 020 |
| CHNL-D-REG-1 | CH-D1 | | | | | 021 |
| CHNL-D-REG-2 | CH-D2 | | | | | 022 |
| CHNL-D-REG-3 | CH-D3 | | | | | 023 |
| CHNL-MODE | CH-MODE | | | | | 025 |
| CA-MODE | | CA-MODE | | | | 026 |
| CHNL/CA-MODE | CH-MODE | CA-MODE | | | | 027 |
| WRITE DATA REG 0,1 | W-REG 0,1 | | | | | 033 |
| OUT-REG-ZAC | OUTPUT REG ZAC | | | | | 043 |
| OUT-REG-PID | OUTPUT REG PI-DATA | | | | | 047 |
| OUT-REG-DATA | OUTPUT REG DATA WD1 | | | | | 053 |
| OUT-REG-DATA | OUTPUT REG DATA WD 2 | | | | | 057 |

* PRIVILEGED REGISTER

Fig. 7d.

| | DATA WORD | | | | | REG # |
|---|---|---|---|---|---|---|
| | 0 | 9 | 18 | 27 | 35 | OCTAL |
| INTERRUPT CONTROL | PN ICBD | | LT0 LT1 LT2 LT3 | LT4 LT5 LT6 LT7 | | 001 |
| PI COMMAND | PI-COMMAND | | | | | 002 |
| DATA TALLY/CONTROL | DATA CONTROL | | | DATA TALLY | | 003 |
| CHANNEL CONTROL | CHANNEL CONTROL | | | | | 006 |
| DATA ADDRESS | DATA-ADDRESS | | | | | 007 |
| MEMORY DATA (H) | H-REGISTER | | | | | 012 |
| LPW | LPW | | | | | 013 |
| CHNL-D-REG-0 | CH-D0 | | | | | 020 |
| CHNL-D-REG-1 | CH-D1 | | | | | 021 |
| CHNL-D-REG-2 | CH-D2 | | | | | 022 |
| CHNL-D-REG-3 | CH-D3 | | | | | 023 |
| MODE REGISTER | CHANNEL | ADAPTER | | ZERO | | 024 |
| CIA DFA-LINES | DATA FROM ADAPTER LINES | | | | | 030 |
| OUT-REG-ZAC | OUTPUT REG ZAC | | | | | 043 |
| OUT-REG-PID | OUTPUT REG PI-DATA | | | | | 047 |
| OUT-REG-DATA | OUTPUT REG DATA WD1 | | | | | 053 |
| OUT-REG-DATA | OUTPUT REG DATA WD 2 | | | | | 057 |

Fig. 7e.

GOES READY ON ANY CLOCK AS SOON AS THE MEMORY IS CAPABLE OF RECEIVING A NEW COMMAND

PROGRAMMABLE INTERFACE APPARATUS AND METHOD

RELATED APPLICATIONS

1. "Steering Code Generating Apparatus For Use In An Input/Output Processing System" invented by Garvin Wesley Patterson, William A. Shelly and Earnest M. Monahan, filed on even date herewith Ser. No. 562,362.
2. "A Pathfinder Microprogram Control Store" invented by Garvin Wesley Patterson and Marion G. Porter, filed on even date herewith, Ser. No. 562,363 and assigned to same assignee as named herein.
3. "Priority Interrupt Mechanism" invented by Earnest M. Monahan, Garvin Wesley Patterson and Jaime Calle, filed on even date herewith, Ser. No. 562,315 and assigned to same assignee named herein.
4. "Dispatcher Mechanism" invented by Earnest M. Monahan and Garvin Wesley Patterson, filed on even data herewith, Ser. No. 562,314 and assigned to same assignee named herein.
5. "Fail Soft Memory" invented by Marion G. Porter, Jaime Calle and Garvin Wesley Patterson, filed on even date herewith, Ser. No. 562,361 and assigned to same assignee as named herein.
6. "Instruction Look Ahead Having Prefetch Concurrency and Pipeline Features" invented by Marion G. Porter, filed on even date herewith, Ser. No. 562,272 and assigned to same assignee named herein.
7. "Data Alignment Circuit" invented by Darrell L. Fett, filed on even date herewith, Ser. No. 559,115 and assigned to same assignee as named herein.
8. "Processor for Input-Output Processing System" invented by Marion G. Porter, Garvin Wesley Patterson, William A. Shelly and Nicholas S. Lemark, filed on even date herewith, Ser. No. 562,317 and assigned to same assignee as named herein.
9. "Mehod of Generating Addresses to a Paged Memory" invented by Garvin Wesley Patterson and Marion G. Porter, filed on even date herewith, Ser. No. 562,330.
10. "Memory Steering in a Data Processing System" invented by William A. Shelly, filed on even date herewith, Ser. No. 562,313.

BACKGROUND OF THE INVENTION

1. Field of Use

The present invention relates to data processing systems and more particularly to input/output systems required to control input/output operations involving a number of peripheral devices.

2. Prior Art

In general, systems include as part of the operating system software a number of interrupt subroutines for processing events producing interrupts. These events may be produced by internal conditions within a system as well as conditions occurring within the input/output devices of the system.

In general, interrupts are recognized in accordance with a predetermined priority by the system processing unit and controllers or control units connected to peripheral devices included in the system. Thus, once the priority for processing events is established, the events are required to be processed in the same way. An important disadvantage of these systems is that certain events may cause the processing unit to interrupt an important program to process an interrupt in connection with a less important program. This in turn results in the wasting of valuable processing time caused by unnecessary switching between programs as a result of a pre-established priority for processing events.

Additionally, in the types of systems mentioned, when an event is detected, the unit causes an interrupt which forces the system to a predetermined location in memory which stores address information for referencing a common interrupt routine, The memory address provided in such instances is fixed with respect to interrupt produced by the device. Thus, these types of systems by requiring different types of interrupts to utilize the same interrupt routine requires the processing unit to then determine the reason for the interrupt and select the appropriate routine for processing the interrupt. This also results in the wasting of valuable processing time caused by having the processing unit call up to the proper program for processing the interrupt. Further, such systems require interrogation programs resulting in program duplication.

Additionally, whenever systems of the type mentioned are required to issue commands to one of the device controllers, this normally necessitates delaying system data transfer operations or requires that such commands be issued only during intervals preceding and following such data transfer operations. This also has reduced input/output processing efficiency.

Accordingly, it is a primary object of the present invention to provide a system which provides for efficient processing of events relating to input/output operations involving a number of peripheral devices.

It is a further object of the present invention to provide a system which provides for efficient switching between programs during the processing of events.

It is still a further object of the present invention to provide a system which facilitates the processing of input/output operations.

SUMMARY OF THE INVENTION

The above objects are achieved according to a preferred embodiment of the present invention which comprises an input/output system including a plurality of modules. Different ones of the modules of the system connect to a different one of the number of ports of a system interface unit. Each such port of certain ones of the modules include in addition to the normal type interfaces a programmable interface. The system modules include and input/output processing unit and at least one unit which has a plurality of ports. Each port connects to a controller adapter and the input/output devices controlled by the adapter.

In accordance with the present invention, the input/output processing unit issues commands on the programmable interface to the multiplexer unit for causing such unit to load or unload information into and from any one of a plurality of registers include within the multiplexer associated therewith, which operatively couple to the programmable interface and used during the performance of input/output operations.

Each of the pluarlity of registers included within the multiplexer unit includes registers for processing interrupts received from the plurality of devices connected to the unit. In accordance with the present invention, the registers provide storage for interrupt control block information coded to specify a set of interrupt routines to be used in processing different types of event signals received from the devices which connect to the unit through a controller adapter. Additionally, the registers provide storage for priority level signals specifying the importance to be accorded in processing the events.

Circuits included in the multiplexer unit are operative in response to an interrupt signal from a device to generate an interrupt request to the input/output processing unit. The request includes signals representative of both the interrupt control block information and the priority level. Additionally, the circuits generate a predetermined code specifying the type of interrupt which is also included as part of the interrupt request. When granted priority by priority circuits included in the system interface unit, the interrupt control block and interrupt type code signals transferred to the processing unit are used by such unit for referencing the appropriate routine for processing the interrupt. The priority level signals also transferred by the system interface unit specify to the processing unit the level at which the process is to be run.

By having the interrupt source provide signals identifying the specific interrupt routine tailroad for processing the particular type of interrupt, the processing of interrupts is made significantly more efficient by relieving the processing unit of the task of communicating with the interrupt source to select the appropriate program. Moreover, by being able to alter the contents of the interrupt control block register through the programmable interface, the input/output processing unit can have different devices start the same or different programs. This provides complete flexibility in processing interrupts since different types of interrupts caused by the occurrence of different events can be associated with any of the available number of interrupt routines. Furthermore, such changes can be made in parallel with system data transfer operations.

Since the assignment of the priority level is alterable by means of commands applied via the programmable interface, it becomes easy for the multiplexer unit to distinguish important events from less important events and classify events. This arrangement provides for efficient program switching since only those events which truly represent a higher priority level activity cause the processing unit to switch programs. Further, it prevents the processing unit from interrupting execution of an important program just to ascertain that a less important event has occurred.

It will be appreciated that the programmable interface because of being independent or separate from other interfaces can also be used for test and diagnostic operations. Normally, a significant part of such operations involve displaying the contents of registers within the different modules of a system. Since the processing unit can read and set registers of any module via commands, this eliminates the need for having to include such apparatus in the system according to the present invention.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 4a and 4b show in greater detail a multiplexer unit of FIG. 1.

FIG. 5a shows the lines which comprise a data interface in accordance with the present invention.

FIG. 5b shows the lines which comprise programmable interface employed in the system of FIG. 1.

FIG. 5c discloses lines which comprise the interrupt interfaces included within the system of FIG. 1.

FIG. 5d shows the lines which comprise a local memory interface of FIG. 1.

FIG. 6 illustrates the format of WREX and RDEX program instructions.

FIG. 7a through 7c illustrate the formats of interface commands.

FIG. 7d illustrates a number of the different load register commands used in connection with multiplexer module 300 of FIG. 1.

FIG. 7e illustrates a number of the different read register commands used in connection with multiplexer 300 of FIG. 1.

DESCRIPTION OF THE PREFERRED EMBODIMENT

General Description

Figure 1:
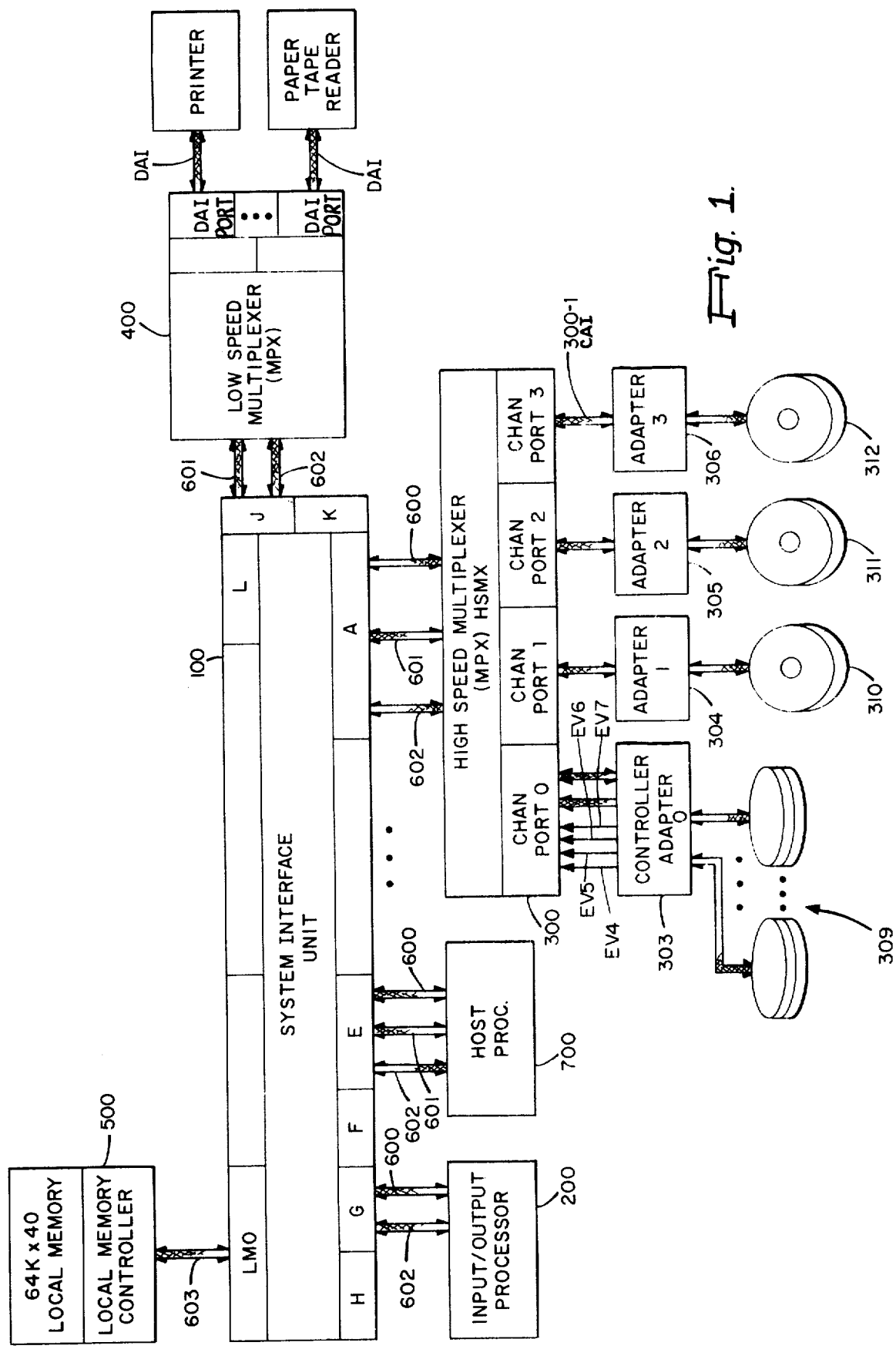
FIG. 1 illustrates in block diagram form an input/output system employing the principles of the present invention.

As seen from FIG. 1, the system which incorporates the principles of the present invention includes at least one input/output processor (IOPP) 200, a system interface unit (SIU) 100, a high speed multiplexer (HSMX) 300, a low speed multiplexer (LSMX) 400, a host processor 700 and at least one memory module corresponding to a local memory module 500. Different ones of these modules connect to one of a number of ports of the system interface unit 100 through a plurality of lines of different ones of different types of interfaces 600 through 603. More specifically, the input/output processor 200, the host processor 700 and high speed multiplexer 300 connect to ports G, E and A respectively while the low speed multiplexer 400 and memory module 500 connect to ports J and LMO respectively.

The input/output system of FIG. 1 can be viewed as including a number of "active modules", "passive modules" and "memory modules". The IOP processor 200, host processor 700 and high speed multiplexer 300 serve as active modules in that each have the ability to issue commands. The active modules normally connect to ports A through H. A plurality of passive modules are connected to three ports J, K and L. These modules correspond to the low speed multiplexer 400 and the system interface unit 100 and are units capable of interrupting and executing commands applied to the lines of interface 601 as described herein. The last group of modules constitute local memory modules and remote memory modules (not shown) such as those of the main system (not shown) which are capable of executing two different types of commands applied to the lines of interface 603.

The input/output system of FIG. 1 normally functions as an input/output subsystem responsive to input/output instructions issued by host processor 700 which normally connects to port F via the interfaces 600, 601 and 602 which correspond to a data interface, a programmable interface and an interrupt interface respectively described in greater detail herein. Ports F and E include interfaces for enabling connection of either multiplexer or processor modules of FIG. 1.

For the purpose of the present invention, processor 700 is conventional in design and may take the form of those units described in U.S. Pat. No. 3,413,613. In the preferred embodiment, the input/output processor 200 initiates and terminates channel programs required for the execution of input/output instructions, processes interrupt requests received from the system interface unit 100 and directly controls unit record peripheral devices couples to low speed multiplexer 400. The processor 200 connects to port H via the data interface 600 and interrupt interface 602.

The low speed multiplexer 400 which for the purposes of the present invention can be considered conventional in design, provides for attachment of low speed peripheral devices via peripheral adapters, each of which couple to the lines of a device adaptor interface (DAI). The interface and adapter may take the form of those units described in U.S. Pat. No. 3,742,457 which is assigned to the assignee of the present invention. The low speed devices include card readers, card punches and printers. As seen from FIG. 1, the multiplexer 400 connects to port J via the programmable interface 601.

The high speed multiplexer 300 directly controls transfers between the groups of disk devices and tape devices 309 through 312 which connect to different ones of the channel adapters 302 to 305. Each of the channel controller adapters 303 through 306 which can to a maximum of 16 devices, in turn connects to a different one of the ports or channels 0 through 3 via the interface lines of a channel adapter interface (CAI) 301-1. The high speed multiplexer 300 connects to port A corresponding to a data interface 600, a programmable interface 601 and an interrupt interface 602.

For purposes of the present invention, each of the channel controller adapters 302 through 305 may be considered conventional in design and take the form of controller adapters described in the aforementioned U.S. Pat. No. 3,742,457.

As mentioned previously, each of the modules connect to different ports of the system interface unit 100. The unit 100 controls the connection of the different modules to each other via transfer paths enabling the transfer of data and control information between pairs of modules. For the purposes of the present invention, the system interface unit 100 can be viewed as a switching network enabling each of the "active" modules to transfer data to and from local memory module 500 when the requesting module has the highest priority and is granted the next available memory cycle. That is, as explained herein, the unit 100 includes priority logic circuits which determine the relative priority of requests from each of the active modules and grants the next available memory cycle to the highest priority request received.

Additionally, the unit 100 includes interrupt priority logic circuits which determine the relative priority of interrupt requests received from each of the modules and selects the highest priority request received and passes the request to processor 200 via a switching network as explained herein.

THE PORT INTERFACES

Before describing in greater detail different one of the modules of FIG. 1, each of the interfaces 600 through 603 referred to previously will now be described with reference to FIGS. 5a through 5d.

Referring first to FIG. 5a, it is seen that this figure discloses the lines which constitute the data interface which is one of the interfaces which provides for exchange of information between an active module and the system interface unit 100. Exchange is accomplished by controlling the logical states of various signal lines in accordance with pre-established rules implemented through a sequence of signals termed "a dialog".

As seen from FIG. 5a, the interface includes an active output port request line (AOPR), a plurality of data to SIU lines (DTS 00-DTS 35, P0-P3), a plurality of steering data to SIU lines (SDTS 0-6, P), a plurality of multiport identified to SIU lines (MITS 0-3, P), an active request accepted line (ARA), an accept read data line (ARDA), a plurality of data from SIU bus lines (DFS 00-35, P0-P3), a plurality of multiport identifier from SIU lines (MIFS 0-3, P), a double precision from SIU line (DPFS), and an accept status line (AST).

The description of the interface lines are given in greater detail in the section to follow.

| Designation | DATA INTERFACE LINES Description |
|---|---|
| AOPR | The active output port request line is an unidirectional line which extends from each of the active modules to the SIU 100. When set, this line signals the SIU that the module request a transfer path over which a command |

-continued

| Designation | DATA INTERFACE LINES Description |
|---|---|
| DTS 00–35, P0–P3 | or data are to be transmitted. The data path lines are a four byte wide unidirectional path (four 10 bit bytes) that extends between each of the active modules and the SIU and are used for transferring commands or data from each active module to the SIU 100. |
| SDTS 0–6, P | The steering data to SIU lines extend from each active module to the SIU 100. These lines are used to apply steering control information to the SIU 100 when the line AOPR is set. Steering control information consists of seven bits and a parity bit which are coded as follows. (a) The state of bit 0 - The type of command applied to the DTS lines (whether the command is a programmable interface command or a memory command). (b) Bits 1-4 are coded to indicate which one of the modules are to receive and interpret the command (commands are interpreted only by memory modules and programmable interface commands shall be interpreted by all modules except input/output processor 200). (c) The state of bit 5 indicates whether one or two words of the command information is to be transferred between the requesting active module and the designated receiving module (one word specifies a single precision transfer and two words specifies a double precision transfer). (d) The state of bit 6 indicates the direction of transfer between the requesting module and the designated receiver module. (e) Bit P is a parity bit generated by the requesting active module which is checked by apparatus included within the SIU 100. |
| MITS 0–3, P | The four multiport identifier to SIU lines extend from active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00–35, P0–P3 | The data from SIU lines are another set of data path lines which are a four byte wide unidirectional path (four 10 bit bytes) which extends from the SIU to each active module. These set of lines are used by the SIU 100 to convey read type data to a designated one of the active modules. |
| MIFS 0–3, P | The four multiport identifier lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be by the active module to complete a transfer (read command). |
| AST | The accept status line extends from the SIU 100 to each active module. The state of this line which is mutually exclusive of line ARDA signals the active module that it should accept status information applied to the DFS lines. |

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed "dialog". The programmable interface includes an accept programmable interface command line (APC), a plurality of programmable interface data from SIU lines PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

faces, the transfer of interrupt requests is accomplished by controlling the logical states of the various signal lines in accordance with pre-established rules implemented through a sequence of signals termed dialog.

The interface includes an interrupt request line (IR), a plurality of interrupt data lines (IDA 00-11, P0-P1) and a plurality of interrupt multiport identifier lines (IMID 00-03) for modules connected to ports A through D. For modules connected to ports G and H, the interrupt interface further includes to a level zero

| Designation | PROGRAMMABLE INTERFACE LINES<br>Description |
| --- | --- |
| APC | The accept programmable interface command line extends from the SIU 100 to each receiving module. When set, this line signals the module that command information has been applied to the PDFS lines of the interface by the SIU and is to be accepted by the module. |
| PDFS 00-35, P0-P3 | The programmable interface data from SIU lines are a four byte wide directional path (four 10 bit bytes) that extend from the SIU 100 to each module. These lines apply programmable interface information from the system interface unit to a designated receiving module. |
| PIR | The programmable interface ready line extends from each module to the SIU. When set, this line indicates that the module is ready to accept a command to be applied to line PDFS. |
| PDTS 00-35, P0-P3 | The programmable interface data to the SIU lines are a four byte wide unidirectional path (four 10 bit bytes) that extends from each module to the SIU 100. These lines are used to transfer programmable interface information to the SIU. |
| RDTR | The read data transfer request line extends from each module connected to the programmable interface to the SIU 100. When set, this line indicates that the previously requested read data is available for transfer to a module and has been applied to the lines PDTS by the module. |
| RDAA | The read data accepted line extends from the SIU 100 to each module. When set, the line indicates to the module that the data applied to the lines PDTS has been accepted and that the module may remove the information from these lines. |

A further interface is the interrupt interface 602 of FIG. 5c which provides for interrupt processing by the input/output processor 200. That is, the interface enables the transfer of interrupt information by an active module to the SIU 100 as well as the transfer of interrupt information by the SIU 100 to the input/output processor 200 for processing. Similar to the other interfaces, present line (LZP), a higher level interrupt present line (HLIP), an interrupt data request line (IDR), a release line (RLS) and a plurality of active interrupt level lines (AIL0-2). As seen from FIG. 5c, the interrupt interface ports G and H do not include an interrupt multiport identifier line. The description of the interrupt interface lines are given in greater detail herein.

| Designation | INTERRUPT INTERFACE LINES<br>Description |
| --- | --- |
| IR | The interrupt request line extends from each module to the SIU 100. When set, this line indicates to the SIU that it requires service. |
| IDA 0-3, P0,<br>IDA 4-11, P1 | The interrupt data lines extend from an active module to the SIU 100. These lines are coded to contain control information required to be transferred to the input/output processor when an interrupt request has been accepted by the processor. These bits are coded as follows:<br>(a) The state of bit 0 specifies to the SIU 100 which os the two processors (i.e. processor number) is to process the interrupt request.<br>(b) Bits 1-3 are coded to indicate the priority or level number of the interrupt request to the SIU 100.<br>(c) Bit P0 is a parity bit for bits 0-3.<br>(d) Bits 4-8 are coded to provide a portion of an address required to be generated by the input/output processor 200 for |

-continued

| Designation | INTERRUPT INTERFACE LINES Description |
|---|---|
| | referencing the correct procedure for processing the interrupt (i.e. an interrupt control block number ICBN). (e) Bit PI is a parity bit for bits 4–11. |
| IMID 00–03 | The interrupt multiport identifier lines extend from each active module to the SIU 100. These lines are coded to identify which specific subchannel of the active module has requested interrupt service. |
| LZP | The level zero present line extends from the SIU 100 to the input/output processor 200. When set, this line indicates that there is a highest priority (level 0 interrupt) request being directed to the processor 200 by the SIU 100. |
| HLIP | The higher level interrupt present line extends from the SIU to the input/output processor. When set, this line indicates that there is an interrupt request having a higher level or priority than the procedure or process being executed by the processor 200. |
| IDR | The interrupt data request line extends from the input/output processor 200 to the SIU 100. When set, this line indicates that interrupt data is to be sent to the processor on lines DFS by the SIU 100. |
| RLS | The release line extends from the input/output processor 200 to the SIU 100. This line when set indicates that the processor 200 has completed execution of the current procedure. |
| AIL 0–2 | The active interrupt level lines extend from the SIU to the input/output processor 200. These lines are coded to designate the interrupt level number of the procedure being executed by the processor 200. |

A last set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed a dialog. The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept PI command line (APC), an accept ZAC command line (AZC), a PI interface ready line (PIR), a ZAC interface ready line (ZIR), a read data transfer request line (RDTR), a plurality of data from memory lines (DFM 00-35, P0-P3, a plurality of request identifier from memory lines (RIFM 0-7, P0-P1), a double precision from memory line (DPFM), a QUAD line, a read data accepted line (RDAA) and a system clock line (SYS-CLK).

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines are given in greater detail herein.

| Designation | LOCAL MEMORY INTERFACE LINES Description |
|---|---|
| DTM 00-35, P0-P3 | The data path lines constitute a four byte wide directional path (36 information lines and four odd parity lines) that extends from the SIU 100 to the local memory 500. These lines are used to transfer memory or programmable interface commands to the local memory 500. |
| RITM 0-3, P0 RITM 4-7, P1 | The requestor identifier to memory lines constitute two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows. (a) Bits 0-1 are port number selection bits coded to specify which port or subchannel within the attached module |

-continued

| Designation | LOCAL MEMORY INTERFACE LINES<br>Description |
|---|---|
| | is to receive or interpret the memory command sent to the module.<br>(b) Bit 2 is a read/write to memory bit which is included in the steering control information received from the active module which is forwarded by the SIU to the local memory 500 when a new command is sent to the memory by the SIU 100. The state of this bit indicates the direction of data transfer.<br>(c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set, this line indicates that the command information applied to the lines DTM is to be accepted by the local memory module 500. |
| PIR/ZIR | The programmable interface ready line ZAC interface ready line extends from the local memory module 500 to the SIU 100. When set, this line signals the SIU 100 that the local memory module 500 is capable of accepting a programmable interface (PI)/(ZAC) command. |
| RDTR | The read data transfer request line extends from the local memory module 500 to the SIU 100. This line when set indicates that the read type data previously requested by a ZAC or PI command is available along with the necessary control information to be sent to the module requesting the data. |
| DFM 00–35, P0-P3 | The data from memory lines are a four byte wide unidirectional bus which extends from the local memory module 500 to the SIU 100. These lines are used to return read requested type data to an active module via the SIU 100. |
| RIFM 0-3, P0,<br>RIFM 4-7, P1 | The two groups of requestor identifier from memory lines extend from the local memory module 500 to the SIU 100. These lines are coded for directing the read data back from module 500 back to the requesting module. |
| DPFM and QUAD | The double precision from memory line and QUAD line extend from the local memory module 500 to the SIU 100. These lines are coded to indicate the number of words to be transferred via the SIU 100 to the requesting module during read data transfer request time interval. These lines are coded as follows<br>QUAD DPFM<br>0 0 one word single precision<br>0 1 two words, double precision<br>1 X<br>(don't care) four words |
| DSD | The read data/status identifier line extends from the local memory module 500 to the SIU. The state of this line signals the SIU 100 whether the information applied to the lines DFM is read data or status information when line RDTR is set. When set, the line indicates status information of one or two words (QUAD=0) is being transferred. When set to a binary ZERO, the line signals that up to four words of data are being transferred, the number being specified by the coding of lines QUAD and DPFM. |
| RDAA | The read data accepted line as mentioned in connection with the programmable terminal extends from the SIU 100 to the local memory module. When set, this line signals the memory module that the data applied on the interface lines by the local memory module has been accepted and that the local memory module may remove data from these lines. |

-continued

| Designation | LOCAL MEMORY INTERFACE LINES Description |
|---|---|
| SYS-CLK | The system clock line is a line which extends from the SIU 100 to each module of the system. This line is connected to a clock source included within the input/output processor 200 to synchronize the operations of each memory module from a common system clock source. |

While FIGS. 5a through 5d show the lines which connect the different modules of the system of FIG. 1 to the SIU 100, it will be appreciated that other lines are also included for signaling other conditions as for example error conditions and operational conditions. Having described the different types of interfaces utilized by the modules of FIG. 1, each of the modules pertinent to the understanding of the present invention will now be described in greater detail.

Detailed Description of Input/Output Processor 200

Figure 2:
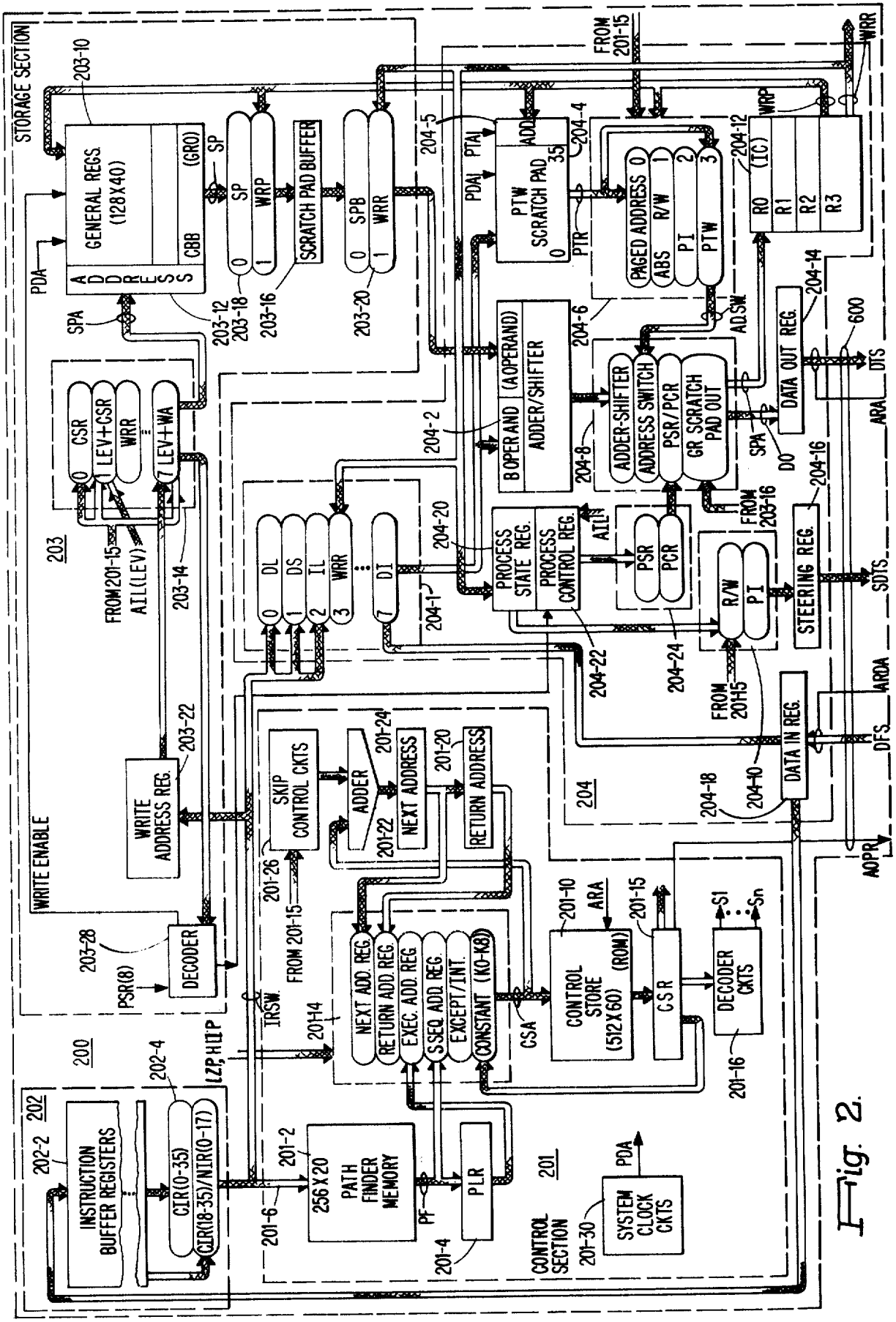
FIG. 2 shows in greater detail the input/output processing unit of FIG. 1.

Referring to FIG. 2, it is seen that the processor 200 comprises a microprogrammed control section 201 operative to generate control signals in response to microinstructions stored in a control store 201-10 for executing instructions, an instruction buffer section 202 for storing instructions fetched from the local memory module 500, a storage section 203 and a processing section 204 for performing arithmetic and logic operations under the control of microprograms stored in control store 201-10.

Control Store Section 201

Considering each section in greater detail, the control store 201-10 is constructed of fixed sections which use for example a read only memory (ROM). The store 201-10 is addressable via signals from any one of the eight address sources applied to a selector switch 201-14. The contents of the addressed locations are read out into an output register 201-15 and decoded by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microinstructions read out to register 201-15 include address constants for branching the control store 201-10 to appropriate microprogram routines.

As seen from FIG. 2, the eight control store address sources include: interrupt/exception signals derived from signals applied by the system interface unit 100 and circuits included within processor 200; a next address register position which receives next address information stored in a register 201-22 via an adder circuit 201-24; a return address register position which receives the return address contents of a return register 201-20; an execution address register position which receives an address from a pathfinder memory 201-2 via memory output register 201-4; a sequence address register position which also receives an address from register 201-4; and a constant position which receives a constant value from the output register 201-15.

The appropriate next address is generated by adder circuit 201-24 which receives as one operand input, address signals from one of the sources selected by switch 201-14 and as other operand input, signals from skip control circuits of a block 201-26. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by switch 201-14 and constant signals provided by skip control circuits of block 201-26. Briefly, the different positions of switch 201-14 are selected in response to microinstructions read from control store 201-10 to provide appropriate addresses for microprograms stored in control store 201-10 required for the execution of an operation specified by the op code of a program instruction. The instruction op code is applied to the pathfinder memory 201-2 via path 201-6 as shown. The return address register position of switch 201-14 is selected during program sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 2 that a higher level interrupt present (HLIP) and level zero interrupt (LZP) lines apply signals to switch 201-14. The signal applied to the HLIP line is "ANDed" with interrupt inhibit signals from a process control register 204-22 and the result is ORed with the signal applied to the LZP line. When the higher level interrupt present signal is not inhibited or there is a signal applied to the LZP line, signals from circuits, not shown connected to switch 201-14 select the exception/interrupt position. The signal lines indicative of the presence of an interrupt (LZP and HIPL) cause the selection of an interrupt sequence of microinstructions to be referenced in lieu of reinforcing the microinstruction sequence for executing the next program instruction.

Signal lines indicative of "exceptions" are applied to control circuits, not shown, associated with switch 201-14 and cause the selection of the exception/interrupt position. This provides an address for referencing an exception sequence of microinstructions. Depending upon the type of execution, the exception may be processed immediately because continuing program instruction execution must be prevented or it is not possible (e.g. faults, illegal instructions). The exception is processed upon the completion of execution of the program instruction where the condition does not require immediate attention (e.g. time out, overflow, etc.). As explained herein, the occurrence of exceptions cause the exception/interrupt position of 201-14 to be selected and the setting of an appropriate bit position in process control register 204-22.

Timing signals, designated as PDA in FIG. 1, required for establishing appropriate memory cycles of operation for control section 201 as well as timing signals for operating other sections of processor 200 and the other modules of the system of FIG. 1 are provided by clock circuits included within a block 201-30. For the purpose of the present invention, the clock circuits as well as the other circuits of FIG. 2 can be considered conventional in design and can for example take the form of circuits disclosed in the publication titled "The Integrated Circuits Catalog for Design Engineers" by Texas Instruments Inc., printed 1972. More specifically, the clock circuits can comprise a crystal controlled oscillator and counter circuits while the switch 201-14 can comprise a plurality of data selector/multiplexer circuits.

From the above, it is seen that as in most microprogrammed control machines, the control store 201-10 provides the necessary control for each processor cycle of operation. That is, each microinstruction word read out from control store 201-10 during a cycle of operation is divided into a number of separate control fields which provide the necessary input signals to the various selector switches of FIG. 2 for addressing of the different scratch pad memories and selection of operands, signals for specifying various test conditions for branching, signals for controlling the operation of an adder/shifter unit of section 204 and signals for providing control information necessary for generating commands. For more detailed information regarding the operation of control section 201, reference may be made to the copending application titled "Pathfinder Control Memory" invented by G. Wesley Patterson et al which is assigned to the assignee of the present invention. Reference may also be made to other ones of the documents referenced in the introductory portion of the specification.

Instruction Buffer Section 202

This section includes a plurality of registers 202-2 for storing up to four words of instructions fetched from local memory module 500 and applied via a data in register 204-18. The group of registers 202-2 are connected to a two position instruction register switch 202-4 which is arranged to provide two outputs, a current instruction read output (CIR) and a next instruction read output (NIR). The selection of instruction words on a half or full word basis is made in accordance with the states of bit positions of the current instruction counter (IC) normally stored in a first of the working registers of block 204-12. For the purpose of the present invention, the arrangement can be considered conventional in design.

Storage Section 203

As seen from FIG. 2, this section comprises a scratch pad memory containing eight sets or groups of registers associated with eight different processes each assigned a different one of eight priority levels. The highest priority level is level 0 and the lowest priority level is level 7. Each group or level includes 16 registers used as described herein.

The scratch pad memory 203-10 is addressed via an eight position data selector switch 203-14 which selectively applies a seven bit address from any one of eight sources to address inputs 203-12. The three most significant bit positions of address inputs 203-12 select one of the eight sets of registers (i.e. the level) while the remaining four bits select one of the sixteen registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The write address register 203-22 is loaded via switch 202-4 to store signals corresponding to either bits 9–12 or bits 14–17 of the current program instruction as designated by one of the fields of the microinstruction contained in register 201-15. Accordingly, the write address register provides address storage for loading or returning a result to one of the general registers of scratch pad memory 203-10. The write operation occurs upon the generation of a write clock signal which occurs either in response to switching to a binary ONE a clocked write flip-flop not shown, or in response to a field of a microinstruction loaded into register 201-15. When generated by the write flip-flop, the write clock signal occurs when the write flip-flop is reset to a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 via selector switch 203-14 which is operative to generate a signal on an output line each time register 203-22 stores an address of 0, 1 or 15. This signal inhibits the generation of a write clock pulse by gating circuits, not shown, when write flip-flop is in a binary ONE state. Additionally, the decoder network 203-28 receives a mode signal from the process state register 204-20. The state of the signal which indicates whether the processor 200 is in a master or slave mode of operation is "ANDED" with the output signal and is used to generate an exception signal on another output line which is applied as an input to process control register 204-22 and to one causes selection of the exception-interrupt position of switch 201-14. As explained herein, this prevents alteration of the contents of the process state register location (GRO) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives data signals applied from one of a pair of output buses selectively connected to any one of four working registers of block 204-12.

Each set of 16 registers includes a process state register (PSR) location (general register 0) for storing information essential to controlling the current process. The first eight bit positions of the register stores steering information coded to identify the interrupting module. The next position is a privilege bit position coded to identify the mode of operation (i.e. master or slave). The register also includes an external register bit position coded to indicate whether the register contents can be altered, an address mode bit position, two condition code bit positions, a carry bit position and 22 bit positions for storing a count which is periodically decremented while the associated process is active (i.e. serves as a "process timer"). Because of the frequency of access to the contents of the process state register required for modification or reference, signals representative of the contents of this register are stored in one of the registers of the processing section 204 (i.e. register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers include a page table base register (general register 15), and a number of general registers (general registers 2-14) for providing temporary storage for operands and address information. The scratch pad memory 203-10 also includes a control block base (CBB) register location which stores an absolute addresss pointing to the base of an exception control block and interrupt control block tables stored in local memory module 500. The first register GR0 of the highest priority set of registers (level 0) which is never altered, stores the control block base information. The interrupt control block (ICB) tables include 256 groups of storage locations which store information for processing the type of interrupt. The exception control block (ECB) tables include 16 groups of storage locations which store information for processing the type of exception.

Exceptions are processor detected conditions which cause the processor 200 to enter automatically one of the 16 exception processing routines. The exception conditions are identified by a four bit exception number which corresponds to bits 10-13 of the program instruction when the processor enters master mode. In all other instances, the exception number is ZERO. The exception number (ECB #) is used to identify one of the four word exception control blocks (ECB) which points to an exception processing routine. The byte address of an ECB equals the control block base (CBB) − 16 (ECB # +1). Each ECB includes values for loading the PSR, IC and PTBR registers in addition to a saving area pointer which serves as a stack area for storing information pertinent to the current process before the processor 200 enters the exception routine.

The address of an interrupt control block (ICB) equals the control block base (CBB) + 16(ICB #). The ICB # is obtained from the interrupt word as explained herein. Similarly, the ICB is a four word block and it contains values for the PSR, IC, GR14 and PTBR registers.

Processing Section 204

This section performs all of the arithmetic and logic operations required to process program instructions. The section 204 includes an adder/shifter unit 204-1 capable of performing arithmetic, shift and logic operations upon a pair of 36 bit operands. The results produced by either an adder portion or shifter portion of unit 204-1 are selected in response to microinstructions and thereafter selectively transferred via a four position data selector switch 204-8 on a pair of output lines to any one of the working registers of block 204-12 and to a data output register 204-14. The data output register 204-14 connects to the lines of the processor data interface 600.

For the purposes of the present invention, the adder/shifter unit 204-1 can be considered conventional in design. Also, the unit 204-1 may include either circuits such as those disclosed in Patent 3,811,039 to John P. Stafford or circuits disclosed in other documents referenced in the introductory portion of the present specification.

The block 204-12 includes four working registers R0 through R3 which provide temporary storage for the instruction counter and for addresses during instruction execution. The registers can be loaded from any one of the sources connected to switch 204-8 (i.e. adder/shifter 204-1, address switch 204-6, PSR/PCR switch 204-24 and scratch pad buffer input switch 203-18). The register to be loaded and the write signal required for loading the register is established by fields included within the microinstruction read out to register 201-15.

As seen from FIG. 2, the registers are connected to a pair of output buses WRP and WRR. The WRP bus connects to address inputs 204-5, the switch 203-18 and to scratch pad memory 203-10. The WRR bus connects to A operand switch 203-20, to B operand switch 204-1, to register 204-20 and to register 204-22. The registers selected for connection to the WRR and WRP buses are designated by a pair of fields included within the microinstruction read out to register 201-15.

As seen from FIG. 2, the processing section 204 includes process state register 204-20 and a process control register 204-22. The process state register 204-20 as mentioned is loaded from scratch pad memory 203-10 via output bus WRR. The process control register 204-22 is a 36 bit register common to all eight interrupt levels.

The bit positions of the process control register 204-22 contain the following information. Bit positions 0-8 designate different types of non master mode exceptions which include the following.

| PCR BIT POSITION | EXCEPTION TYPE |
|---|---|
| 0 | Operation not complete; no response from SIU 100 on lines ARA or ARDA. |
| 1 | Page address bounds fault (key check). |
| 2 | Page access fault |
| 3 | Page not resident in memory |
| 4 | Illegal operation |
| 5 | Process timer run out |
| 6 | Overflow |
| 7 | Lockup fault |
| 8 | Address misalignment |

The term "fault" does not necessarily mean the occurrence of a hardware failure but includes error conditions, etc.

Bit positions 9-15 identify the location of parity errors and bit positions 23-26 identify the processor number and level received from the PNID and AIL lines. Bit position 27 is an interrupt inhibit bit position while bit positions 28-35 store interrupt request bits which when set to a binary ONE indicate an interrupt at a level corresponding to the bit position (e.g. bit 28 = level 0). The bit positions 27-35 are loadable by program instruction from the bank of registers of block 204-12 via output bus WRR.

The contents of each of the registers 204-20 and 204-22 are selectively applied as an input to another one of the positions of the four position data selector switch 204-8-via a two position data selector switch 204-24. The register 204-20 also connects to the PI positions of a two position steering selector switch 204-10 and a four position address selector switch 204-6.

The steering switch 204-10 provides steering information to the SIU 100 which is used to transfer the command to the correct module. One of the fields contained in the microinstructions read out to register 201-15 selects the appropriate position for either a memory command or PI command. The steering information for a memory command is generated from fields included within the microinstruction and with paged address information from scratch pad memory 204-4 or absolute address information from bus WRP.

In the case of a PI command, the steering information is generated as follows: bit 0 is forced to a binary ONE for a PI command; bits 1–4 correspond to bits 0–3 of register 204-20; and bits 5–6 correspond to bits of one of the fields of the microinstruction which are coded to designate whether it is a single or double word transfer and whether it is a read or write cycle of operation. Upon the start of a memory cycle or initiation of a command, the signals from the steering switch 204-10 are loaded into a steering register 204-16 which applies the signals to the appropriate lines of the data interface 600 of processor 200. As explained herein, the command including additional steering information is provided by position 2 of address switch 204-6 in the case of a PI command.

As also seen from FIG. 2, processing section 204 includes a scratch pad memory 204-4 addressable via address inputs 204-5 which receives address signals from one of the registers connected to the WRP bus. The scratch pad memory 204-4 provides page table address storage for each of the eight interrupt levels used in generating absolute addresses for addressing local memory module 500. When addressed, the contents of the storage location of scratch pad memory 204-4 are read out to two of the four positions of the address switch 204-6. These two positions are used for page referencing of local memory module 500. Since the paging operations of scratch pad memory 204-4 are not particularly pertinent to the present invention, no detailed discussion is included herein. For further information regarding the use of paged addressing, reference may be made to the documents cited at the introductory portion of the specification.

The other two positions of the address selector switch 204-6 are used to provide the memory or PI command. More specifically, position 1 of address switch 204-6 when selected by an address control field of a microinstruction word stored in register 201-15 generates the R/W memory command information which includes bits 0–8 coded in accordance with predetermined fields of the microinstruction word and bits 9-35 coded to correspond to either paged address information from memory 204-4 or absolute address bits applied to output bus WRP by the working registers of block 204-12. When the PI position of switch 204-6 is selected, the switch generates a programmable interface command word wherein bit 0 is a binary ZERO, bit 1 is supplied by a field of the microinstruction word stored in register 201-15, bit 2 is supplied by bit 9 of PSR register 204-20 and defines whether the current process can alter certain external registers, bits 5–8 are equal to bits 4–7 of register 204-20 and define the port or subchannel within the module, bit 3 is coded to specify the processor pair number supplied by the SIU 100, bit 4 is a ZERO and bits 9–35 equal bits 9–35 of bus WRP which correspond to the absolute address of the PI command.

DETAILED DESCRIPTION OF SYSTEM INTERFACE UNIT 100

Interrupt Section 102

Figure 3A:
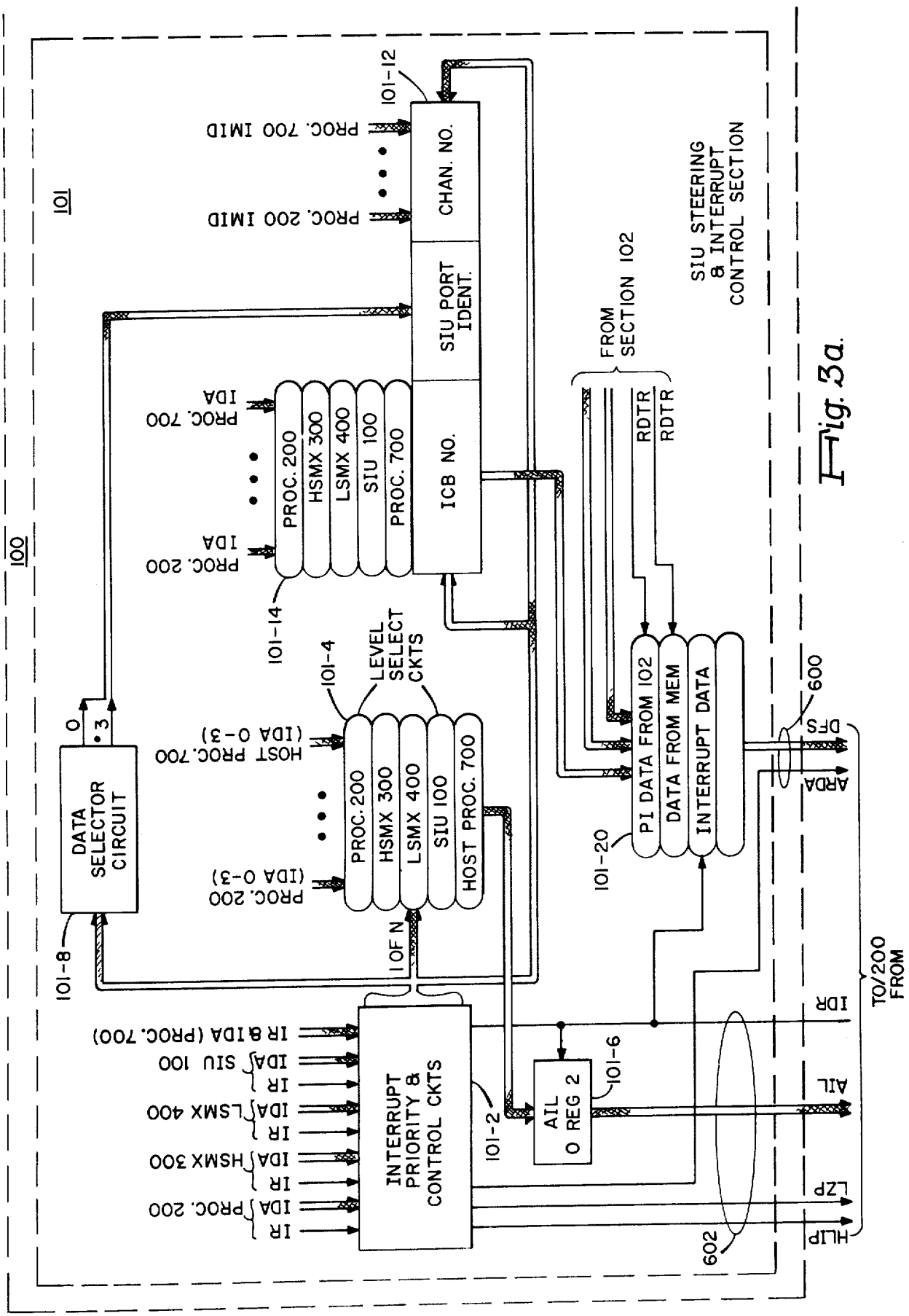
FIGS. 3a and 3b show in greater detail the system interface unit of FIG. 1.

The System Interface Unit 100 as mentioned provides for communication between modules of the system of FIG. 1 via a plurality of crossbar switches. Separate crossbar switches are used to collect signals from the lines of each of the different interfaces of the modules. FIG. 3a shows the switches and circuits of interrupt section 102 for handling the module interrupt interfaces. In the system of FIG. 1, there are modules which connect to ports LMO, A, E, G and J, each of which apply signals to the SIU 100 via different ones of the lines of its interrupt interface 602. Additionally, SIU 100 also provides signals via an interrupt interface associated with port L of FIG. 1.

As seen from FIG. 3a, each of the modules when requesting service applies a signal on its interrupt request (IR) line together with appropriate interrupt identifier information on its IDA lines which are applied to the circuits of an interrupt priority and control block 101-2. The circuits of block 101-2 monitor all interrupt interfaces and signals the appropriate processor corresponding to processor 200 when there is a request having a priority higher than that of the process being executed. When processor 200 signals that it is able to accept the request, the SIU 100 gates the identifier information associated with the highest priority request to processor 200. The identifier information includes an eight bit interrupt control block number including a parity bit, a three bit interrupt level number and an one bit processor number with a parity bit and a four bit channel number.

Considering interrupt section 102 in greater detail, the circuits of block 101-2 include decoder circuits which decode the processor number and interrupt request signals. Providing that there is no parity error, the output signals from the decoder circuits are applied to priority logic circuits of the designated processor logic circuits. The priority logic circuits decode the interrupt level signals and determine the highest priority level and then determine the port priority so that the module having the highest priority level and highest port priority is selected. The interrupt port priority within any given level is as follows:

Old; port L; port A, port B, port C; port D; port E; port F, port G; port H; port J and port K.

This means that in the system of FIG. 1 that the port of the current process has the highest priority followed by the SIU 100, the high speed multiplexer 300, the host processor 700, the processor 200 and the low speed multiplexer 400.

The priority circuits of block 101-2-are operative to generate an output signal on one of n number of output lines, n corresponds to the number of interrupting modules within the system. The n output lines are applied to an eight position data selector switch 101-4 which selects the interrupt level signals of a level of interrupt having a priority higher than the level currently in progress to be loaded into a register 101-6. The output signals from register 101-6 are applied to the AIL lines when processor 200 forces the IDR line to a binary ONE in response to the SIU 100 having forced prior to the higher level interrupt present (HLIP) line or the level zero present (LZP) line to a binary ONE. When the current process is not inhibited from being interrupted, an interrupt request causes the processor 200 to suspend the current process and to accept an interrupt word from the SIU 100 including the identifier information mentioned previously. More specifically, the interrupt word is formatted as follows.

Bit 0 is a new interrupt bit position. When set to a binary ONE indicates that the interrupt is a new one and when set to a binary ZERO indicates that the interrupt is that of a previously interrupted process that is to be resumed.

Bits 1-17 are unused and are binary ZEROS.

Bits 18-27 define the interrupt control block number with bits 18 and 27 being set to binary ZEROS.

Bits 28-31 are generated by the SIU 100 and identify the source module as explained herein in accordance with the present invention.

Bits 32-35 are generated by the modules having multiple ports and identify the subchannel or port within the source module as explained herein in accordance with the present invention.

For more detailed information regarding the implementation of the circuits of block 101-2, reference may be made to the copending patent application titled "Priority Interrupt Hardware" referenced in the introductory portion of the specification.

It is also seen that the output lines from interrupt priority circuits 101-2 are applied to a further data selector switch circuit 101-8. Since only the requesting module having the highest priority will apply a signal to selector circuit 101-8, the selector circuit is connected to provide a predetermined wired-in set of coded steering signals which identify the physical port to which the requesting module granted priority connects (i.e. bits 28-31 of the interrupt word).

In the present embodiment, the following steering codes are generated for identifying the modules of FIG. 1.

| CODE | SIU PORT (MODULE) IDENTIFIED |
|------|------------------------------|
| 0000 | Local memory module - port LMO |
| 0001 | port K |
| 0010 | SIU 100 - port L |
| 0101 | Low speed multiplexer 400 - port J |
| 0110 | processor 200 - port G |
| 1101 | high speed multiplexer 300 - port A |
| 1110 | host processor 700 - port E. |

The four bit code generated by the selector circuit 101-8 is in turn applied to a group of conventional AND gating circuits included within a gating network 101-12. The other identifier information provided by the different source system modules are also applied to other gating circuits of network 101-12. Specifically, each module applies an interrupt control block number (ICBN) via its IDA lines to a different one of the positions of an eight position data selector switch circuit 101-14. Additionally, each module provides the information identifying the requesting subchannel or port of the source module to other ones of the gating circuits of network 101-12 via the IMID lines of the interrupt interface. When the processor 200 forces its interrupt data request (IDR) line to a binary ONE, the SIU 100 applies the signals from gating network 101-12 to the data from SIU (DFS) bus lines of the processor data interface 600 via one of the positions of a four position data selector switch circuit 101-20. The other positions of switch 101-20 are not shown since they are not pertinent to an understanding of the present invention.

Data Transfer Section 102

Figure 3B:
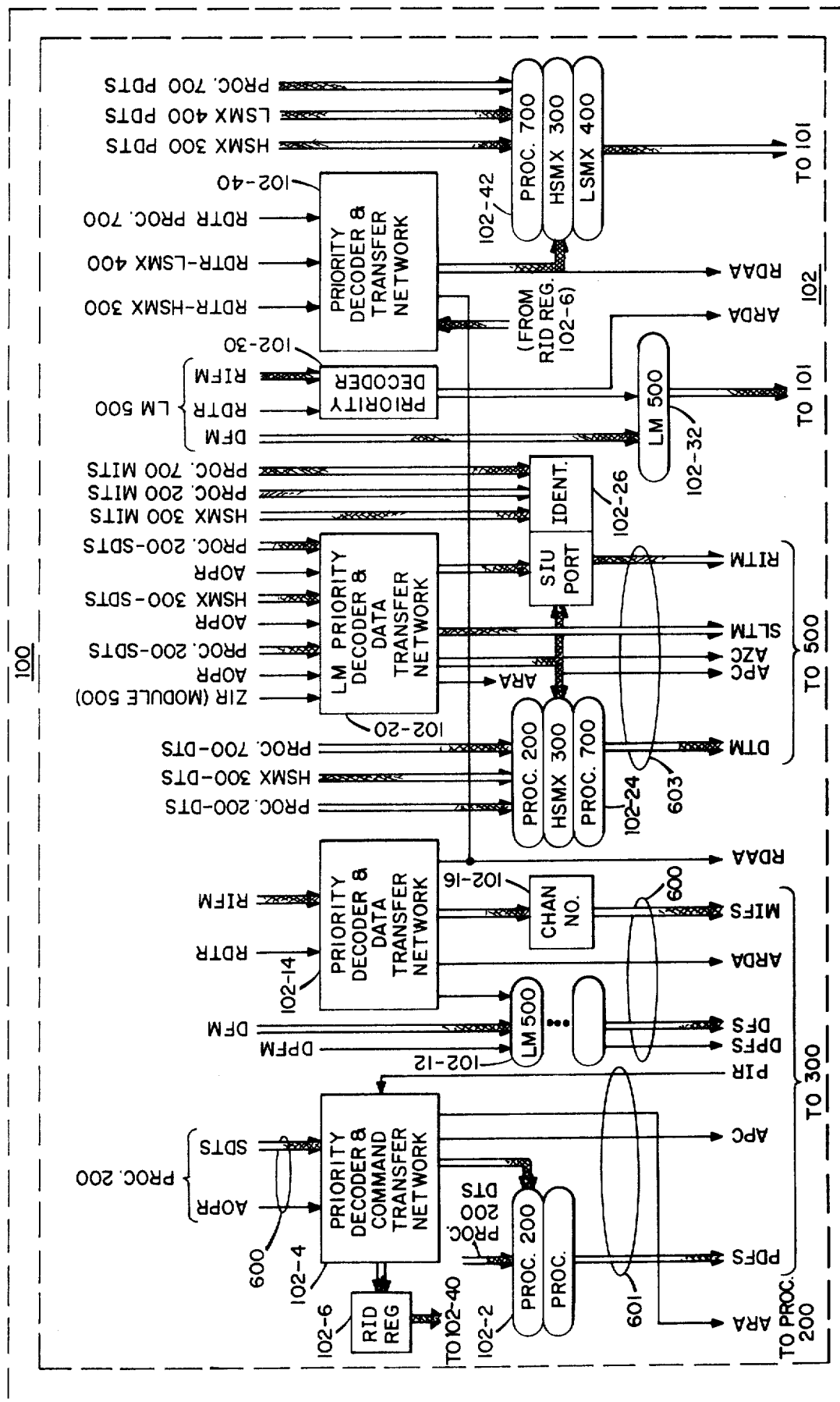

FIG. 3b shows the data transfer section 102 of the system interface unit 100. This section includes priority circuits which establishes which source module is to transfer commands to the high speed multiplexer 300 on its programmable interface 601 and which source module is to transfer data to the multiplexer 300 on its data interface 600. Additionally, section 102 includes priority circuits which determine which source module is going to transfer either data or commands to local memory module 500.

It will be appreciated that transfers between a pair of modules occurs when one module has generated a request to the other module and that the request has been accepted by the other module. In order for a request to be accepted, the requesting module must have the highest priority, both modules must be in a state to receive information and that the transfer path over which the transfer is to take place must be available (i.e. not busy).

As concerns the signals applied to section 102 by processor 200, the generation of these signals is to a large extent controlled by the different fields of the microinstructions read out into processor register 201-15 of FIG. 2. For example, the active output port request (AOPR) line from processor 200 applied to the circuits of block 102-4 is enabled in accordance with a SIU request type control bit field of each microinstruction read out to register 201-15 which is coded to define a transfer of a read/write memory or programmable interface command. The data to SIU lines (DTS) of the processor data interface 600 applied to a two position data selector switch 102-2 constitute command information generated under microprogram control which is loaded into the processor data output register 204-14 of FIG. 2. The steering data to SIU (SDTS) lines receive signals generated under microprogram control which are loaded into the processor steering register 204-16 of FIG. 2.

For the system of FIG. 1, only I/O processors transfer commands to the multiplexer 500 only and processor 200 applies signals to network 102-4. The network 102-4 therefore includes decoder circuits which decode the steering information from the processor module to establish when the module desires to transfer commands to the multiplexer 300. In the case of more than one I/O processor when more than one module desires to transfer during the same cycle, a priority network included in network 102-4 selects the module assigned the highest priority and enables the transfer of a command by that module to the multiplexer 300 on the PDFS lines of its programmable interface 601. More specifically, the network 102-4 applies signals to the two position selector switch 102-2 which selects signals from the appropriate module. This occurs when the multiplexer 300 signals the SIU 100 that it is ready to accept a command by forcing the PIR line to a binary ONE. At the same time, network 102-4 forces the APC line to a binary ONE signaling the multiplexer 300 to accept the command applied to the PDFS lines. When the processor 200 executes an instruction causing it to send a programmable interface (PI) command to the multiplexer 300, the processor 200 places the processor number identification into bit 3 of the command. The multiplexer 300 stores the processor number contained in the command until it wants to issue an interrupt request at which time the processor number is included as part of the interrupt data as explained herein. When the PI command is forwarded to multiplexer 300, the steering information identifying processor 200 as the requester is stored in a register 102-6 associated with multiplexer 300 (port A). As explained herein, when multiplexer 300 responds by generating a read data transfer request to SIU 100, the contents of register 102-6 is used to identify processor 200 as the actual module to receive the data.

A similar arrangement is employed is employed for transferring data signals to multiplexer 300. In FIG. 1, memory module 500 is the only module which transfers data to multiplexer 300. Such transfer occurs in response to a read memory command (ZAC) forwarded to the memory module 500 by multiplexer 300 via network 102-20 as explained herein. When multiplexer 300 forwards the command, the SIU 100 generates the appropriate 4 bit requestor identifier code (steering code) which it appends to the multiport identifier information received from multiplexer 300. The information is stored by the memory module 500 and returned to the SIU 100 when the module 500 generates a read data transfer request to designate that multiplexer 300 is to receive the data. Also, when the SIU 100 accepts the request, it notifies the multiplexer 300 by forcing line ARDA to a binary ONE.

The read data transfer request (RDTR) line when set by memory module 500 signals the network 102-14 that it is ready to transfer information read out during a cycle of operation. The local memory module 500 also supplies signals to the requestor identifier from memory (RIFM) lines to identify the requesting module to which the information is to be transferred.

More specifically, circuits within a decoder network 102-14 decode the identify signals applied to the RIFM lines and when the signals indicate that the local memory module 500 is ready to transfer information to the multiplexer 300 and that the multiplexer 300 is ready to receive the information, the decoder network 102-14 applies the appropriate signals to the selector switch 102-12 and circuits within a gating network 102-16.

Additionally, decoder network 102-14 applies a signal to the accept read data (ARDA) line of the data interface signaling the multiplexer 300 that it is to accept the data from SIU (DFS) lines of its interface 600. The circuits of block 102-16 apply the appropriate multiport identifier information to multiport identifier from SIU (MIFS) lines identifying the requesting subchannel which is obtained from the RIFM lines. When the transfer has taken place, the network 102-14 forces the RDAA line to a binary ONE signaling the requesting module that the data has been accepted by memory module 500.

An arrangement similar to network 102-14 is used by SIU 100 to transfer PI and memory commands from any one of the modules of FIG. 1 to local memory module 500. The module 500 is operative to force either the programmable interface request (PIR) line or ZAC interface request (ZIR) line applied to a decoder network 102-20 to a binary ONE when it is ready to accept either a programmable interface or memory command. Additionally, the processor 200, the processor 700 and multiplexer 300 apply a network 102-20 signals to the active output port request (AOPR) line and steering data to SIU lines of their respective data interfaces. The network 102-20 upon decoding the steering information applied by each of the modules is operative to generate the appropriate signals to a three position selector switch 102-24 for enabling the module having the highest priority to apply signals to the data transfer to SIU lines of memory module data interface 603. It is also seen that network 102-20 applies signals to either the accept programmable command (APC) line or accept ZAC command mode (AZC) together with the appropriate requestor identification signals on the request identifier to memory (RITM) lines of the local memory module interface 603 via a gating network 102-26.

The last two networks 102-30 and 102-40 are used to transfer memory data and programmable interface data to processor 200 in response to memory commands and PI commands respectively previously generated by the processor 200. As seen from FIG. 3b, the priority decoder network 102-30 has the same input lines as network 102-14 and operates in the same manner to forward the requested memory data to processor 200 via a data selector switch 102-32 and the four position selector switch 101-20 of FIG. 3a. It will be appreciated that since processor 200 processes a single command at a time, there can be no conflict between the modules applying data to selector switch 101-20 for transfer to the processor DFS lines in response to processor requests. That is, after the processor 200 sends a command to one of the modules of FIG. 1, its operation is stalled pending receipt of the requested data. The SIU 100 upon accepting the processor's request forces the processor's ARA line which causes the processor to delay operations.

The separate network 102-40 processes return data requests from those modules responding to PI commands. The network 102-40 decodes the signals applied to the RDTR lines and from register 102-6 together with registers of the other modules, not shown. When the SIU 100 detects that module is trying to return requested data to processor 200 (i.e. requestor identifier stored in multiplexer 300 register 102-6), the network 102-40 generates signals which conditions a three position data selector circuit 102-42 to apply the signals from the PDTS lines of the PI interface of the module trying to return requested data to processor 200. These signals are in turn applied to the processor's DFS lines via selector switch 101-20 of FIG. 3a which is conditioned by the module request signal. During a next cycle of operation, the network 102-40 forces the RDAA line to a binary ONE signaling the module that the data applied to the PDTS lines has been accepted and that the module can now remove such data (i.e. clear its output register). Thus, it is seen that switch 101-20 selectively applies any one of three types of data to the DFS lines of the processor's data interface 600.

For the purpose of the present invention, the circuits included within different ones of the blocks of FIG. 3b may be considered conventional in design and include logic circuits found in the aforementioned publication by Texas Instruments Inc. Also, for the purposes of the present invention, the switching networks can comprise conventional crossbar switches.

DETAILED DESCRIPTION OF HIGH SPEED MULTIPLEXER 300

COMMON SECTION

Figure 4B:
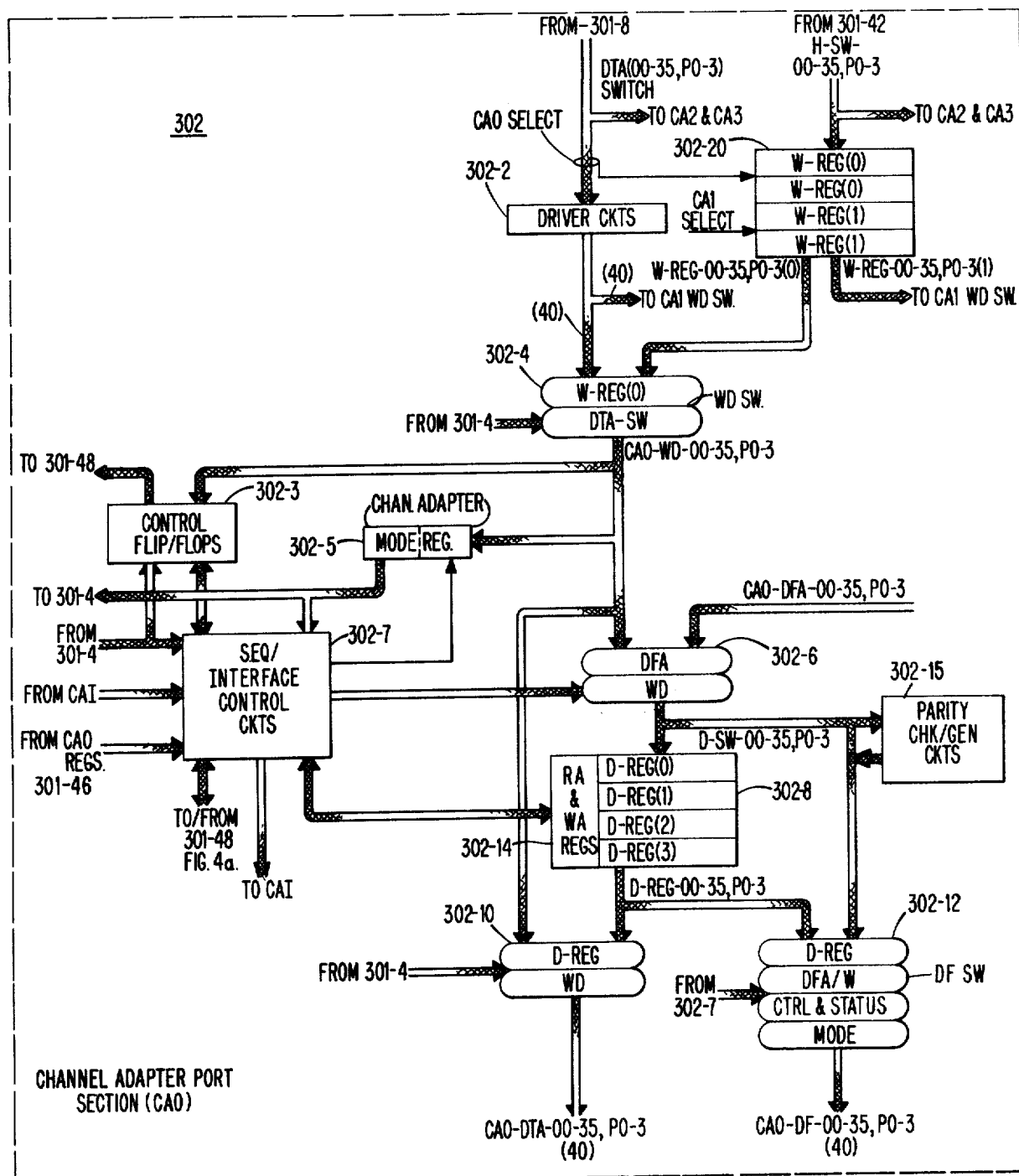

FIGS. 4a and 4b disclose in greater detail the common control section 301 and a portion of the channel adapter section 302. Referring first to FIG. 4a, it is seen that the common control section includes a pair of PI registers 301-2 and 301-5 for storing the words of a PI command received via the PDFS lines of the multiplexer programmable interface 601 through a two position data selector switch 301-1. The switch 301-1 enables PI command signals from an alternate path (i.e. DFS lines) to be loaded into registers 301-2 and 301-5. However, in the preferred embodiment, only the PDFS position will be used. It is also seen that a register 301-40 receives via driver circuits 301-3 memory data applied to the DFS lines of the multiplexer data in interface 600.

The command signals from both registers 301-2 and 301-5 are selectively applied via a two position data selector switch 301-6 of the four channel adapter sections via driver circuits of block 301-8. Also, the command signals can be selectively applied to one position of an eight position data selector switch 301-20 via a two position data selector switch 301-42. The same switch 301-42 also applies the data signals from register 301-40 to each of the four channel adapter sections via driver circuits of block 301-43.

A pair of parity check circuits 301-45 and 301-49 perform a check upon the contents of registers 301-2, 301-5, and 301-40 and apply signals representative of the results to the circuits of block 301-4 which provides status signals applied to C switch 301-50. These circuits comprise logic circuits, conventional in design, which combine signals from register 301-2 with signals from the channel adapter sections to generate control signals necessary for executing the commands received from processor 200.

Additionally, the signals from register 301-5 can also be loaded into a selected one of the plurality of registers of blocks 301-10, 301-12 and 301-14 via driver circuits of blocks 301-8, 301-15 and 301-16. The block 301-10 comprises four 8 bit registers, conventional in design, which may take the form of registers disclosed in the aforementioned Texas Instrument publication (e.g. TI 7481). Output signals from each of these registers can be selectively applied as an input to an interrupt position of selector switch 301-20 together with the corresponding signals from a four position selector switch 301-30 and an eight position selector switch 301-32. The contents of the ICB, level and mask registers of the channel adapter sections can be read during the performance of testing and verification operations in response to PI commands.

Additionally, the interrupt control block registers of block 301-10 are selectively connected to a 14 bit interrupt data (IDA) register 301-22 in response to signals generated by an interrupt level priority network 301-24. Groups of bit positions of each of the 24 bit level registers of block 301-12 are applied to corresponding positions of a different one of the 8 position multiplexer selection switches 301-26 through 301-28. It is also seen that each of the level registers of block 301-12 connect to different positions of the four position selector switch 301-30 and eight position selector switch 301-32. It is also seen that each of the 8 bit mask registers of block 301-14 connect to different positions of the four eight selector switch 301-32 and to the interrupt enable priority and type logic circuits of block 301-34.

As seen from FIG. 4a, the circuits of block 301-34 receive groups of interrupt request signals from channel adapters in addition to groups of interrupt signals generated by the controller adapters attached to the channel adapters. More specifically, each CA channel can generate four different types of interrupt requests. They include a fault interrupt caused by setting of a parity error indicator bit within a common status register, not shown, which can be considered as part of block 301-4, a data control word (DCW) interrupt, a programmable interrupt, and an exception interrupt produced by the detection of an illegal command etc. The fault interrupt is made common to each channel so as to have one input to block 301-34 which is the same for all four channels.

Each controller adapter can also generate four different types of interrupt requests which are dependent upon the type of device connected to the adapter. In the case of a disk device, the types of interrupt requests include: a fault interrupt caused by detection of parity errors, a rotational position sensed interrupt, a data transfer termination interrupt and an off-line interrupt caused by completion of an off-line operation such as a seek operation. The four types of channel interrupt requests and the four types of CA interrupt requests together provide a group of eight types per CA channel designated as events EV0 through EV7. Each type of interrupt request is assigned a three bit type number such that the four channel types of interrupt requests are numbered 0–3 corresponding to EV0-EV3 while the four controller adapter types of interrupt requests are numbered 4-7 corresponding to EV4-EV7. The events having the lowest codes have the highest priority (e.g. 000 = highest priority = EV0 = fault interrupt and 111 = lowest priority type = EV7 = off-line interrupt). The priority for the different types of interrupt requests is fixed and is determined by the type number. For further information regarding the assignment of priority types, reference may be made to the copending application titled "Programmable Interface Apparatus" which is assigned to the assignee of the present invention. Each of the channels provide 7 interrupt requests inputs to block 301-34 together with the common fault input provided by block 301-4.

The circuits within block 301-34 logically combine the signals from each of the mask registers of block 301-14 with the interrupt request signals from each channel and adapter and select the interrupt type having the highest priority for each channel. The three bit type code for each channel is applied to a corresponding one of the multiplexer selector circuits 301-25 through 301-28. The sets of type codes generated by block 301-34 are also applied as inputs to corresponding ones of the positions of a four position level/type selector switch 301-35.

Each of the multiplexer circuits 301-25 through 301-28 upon being enabled by the circuits of block 301-34 provide an appropriate three bit level code as an input to an interrupt level priority network 301-24. The network 301-24 generates signals on a pair of lines which connect as control inputs to the ICB registers of block 301-10, the switch 301-35 and a four position interrupt multiport identifier IMID switch 301-36. The signals generated by network 301-24 designate the channel or port having the highest priority. In the case where more than one channel has the same priority level, the circuits of network 301-24 select the channel assigned the lowest channel number (i.e. CA0=00X-X=highest priority, CA3=11XX=lowest priority). In those instances where the controller adapters employ subchannels or subports, a pair of lines from the CAI provide signals to the low order two bit positions, of switch 301-36. The high order 2 bit positions of the switch are permanently with the corresponding channel adapter number (e.g. 00=CA0 etc.). The output of switch 301-36 is applied to IMID register 301-23 as depicted in FIG. 4a.

The output signals from the selected ICB register of block 301-10, the level signals from the selected multiplexer circuits and the type signals from block 301-34 are merged into the IDA register 301-22. Also, these signals are applied to the parity generator circuits of a block 301-37 which generates a pair of odd parity bits for the signals stored in the register 301-22. A further flip-flop 301-21 which can be considered part of register 301-22 receives a signal from the circuits of block 301-34 to indicate the presence of an interrupt request.

As seen from FIG. 4a, data signals stored in bit register 301-40 are applied via the H register position of two position data selector switch 301-42 to a two position channel write (CW) switch 301-44. The first position of the switch 301-44 when selected loads one of the four groups of channel adapter port registers 301-46 selected in response to signals generated by priority select and control circuits of block 301-48. The circuits of block 301-48 which receive input signals from registers 301-2 and 301-68 and the channel adapters shown apply output signals to the lines and output register 301-65. The registers of group 301-46 include a 40 bit register for storing a list pointer word (LPW) for the port associated therewith, a 40 bit DA register for storing the address of data to be read or stored and a 40 bit register DT for storing tally and control information relating to a current data transfer operation. The same registers of the four channel adapter sections connect to different positions of a four position data selector switch 301-50 which receive control signals from the circuits of block 301-48. The output signals from switch 301-50 are applied to a pair of adder networks 301-52 and 301-54 in addition to a parity check circuit 301-56 operative to check the contents for errors. The adder network 301-52 is operative to update the contents of the register selected via switch 301-50 while the adder network 301-54 applies output signals to a parity generator circuit 301-58. The signals from the circuits 301-52 and 301-58 are returned to the selected register via the update network position of switch 301-44.

As also seen from FIG. 4a, the output signals of switch 301-50 are applied selectively to an 8 bit steering register 301-60 via a steering switch 301-59 and to the DT switch 301-20. Each of the data selector switches 301-59 and 301-61 receives output signals from DT switch 301-20 which in addition to the sources mentioned is connected to receive data signals from the DF lines of each of the channel adapter sections CA0-CA3. The output signals from DT switch 301-20 and ZAC switch 301-61 are applied to a parity generator and check circuit 301-62 and to the bank of registers of block 301-64. Additionally, switch 301-61 is connected to receive zone and command information derived from channel adapter service lines applied to block 301-4 when the multiplexer 300 is being operated in a particular mode not pertinent to the present invention. The four registers of block 301-64 designated as ZAC, PDTS, Data 1 and Data 2 respectively store memory command signals, PI data signals and channel adapter data signals. The output signals from these registers are applied either to the lines DTS of the multiplexers data interface 600 or the PDTS lines of the multiplexers interface 601. When the ZAC register of block 301-64 is loaded, this causes an AOPR flip-flop 301-65 to be switched to a binary ONE which signals the SIU 100 that the multiplexer 300 is requesting a path over which it can transfer a memory (ZAC) command and data. The appropriate memory steering information applied via switch 301-59 will have been stored in register 301-60 and a parity check and generator circuit 301-66 is operative to generate odd parity for the steering information.

CHANNEL ADAPTER SECTIONS

FIG. 4b shows the registers and data selector switch which comprise each of the channel adapter sections CA0-CA3. Since each of the sections are identical, only section CA0 is shown. It is seen that the section receives output signals from data transfer switch 301-6 and H switch 301-42. The signals from DT switch 301-6 are applied via driver circuits of block 302-2 to a two position data selector (WD) switch 302-4. The output command signals from switch 302-4 can be loaded selectively into either a mode register 302-5 or into a plurality of control flip-flops 302-3 in response to control signals from 301-4.

Output signals from the mode register 302-5 and the control flip-flops are applied as inputs to the logic circuits of block 302-7 which generate the required control signals for execution of a command by the controller adapter connected to the section. Also, the circuits of block 302-7 receive control signals from block 301-4 from the register group 301-46 associated with the channel adapter and from the lines of the controller adapter interface.

In the present embodiment, the controller adapter interface includes the following lines.

| CONTROLLER ADAPTER LINES | |
|---|---|
| Designation | Description |
| DTA | The data to adapter lines are 40 lines which extend from the module 300 to the controller adapter used to transmit data including commands and addresses to the adapter. |
| ADTA | The accept data to adapter line extends from the module 300 to the adapter and when set indicates that data is available on the DTA lines and that it should be accepted by the adapter. |

-continued

| CONTROLLER ADAPTER LINES | |
|---|---|
| Designation | Description |
| ACTA | The accept control to adapter line extends from the module 300 to the adapter and when set indicates that a PI command or data is available on the DTA lines and that it should be accepted by the adapter. |
| CHBSY | The channel busy line extends from the module 300 to the adapter and when in an indirect mode indicates to the adapter that the multiplexer 300 is now in an Auto data transfer mode; the channel remains busy until the termination of the Auto data transfer operation. In a direct mode, this line is set when a memory (ZAC) command is received from the adapter and remains set until either the requested read data is transferred or status is returned from the memory module. |
| CDR | The channel data ready line extends from the module 300 to the adapter and when set indicates that the module 300 is ready to accept more data or commands from the adapter. |
| EDT | The end data transfer line extends from the module 300 to the adapter and is used during Auto data transfer operations in indirect mode to indicate that the last word of data has been transferred (Write) or that the last word of data has been stored (Read). |
| DFA | The data from adapter lines are 40 lines which extend from the controller adapter to module 300 used to transfer data including status memory addresses, commands, to module 300. |
| PIDFA | The port identifier from adapter lines are two lines from the adapter to module 300 used in conjunction with the interrupt lines to indicate which subport on the controller adapter caused the interrupt. |
| ADFA | The accept data from adapter line extends from the adapter to module 300 and when set indicates that data or memory command is applied to the DFA lines and should be accepted by module 300. |
| AD-BUSY | The adapter PI busy line extends from the adapter to module 300 and when set indicates that the adapter has accepted a PI command and is not capable of accepting any more commands. |
| ADR | The adapter data ready line extends from the adapter to the module 300 and when set indicates to the channel that the adapter is ready to accept more data. |
| IFA | The interrupt from adapter lines are four lines which extend from the controller adapter to module 300 and indicate the type of interrupt requests (i.e. generates EV4-EV7 signals applied to block 301-34). |
| TFA | The terminate from adapter line extends from adapter to module 300 and when set indicates the termination of a data transfer operation to module 300. |

It will be appreciated that the controller adapter interface includes other lines required for performing other functioning such as initializing, enabling, etc.

Output signals from switch 302-4 are applied to a further two position selector switch 302-6 which also receives data signals applied to the lines DFA by the controller adapter associated therewith. During a data transfer operation, the output signals from the DFA position of switch 302-6 are loaded into different ones of the four 40 bit data registers 302-8 for transfer to common section 301 via a four position switch 302-12 or to the controller adapter via a two position selector switch 302-10. Additionally, output signals from WD switch 302-4 are transferred to the controller adapter via the WD position of switch 302-10. Different ones of the registers 302-8 are selected for loading and unloading by the address signals stored in read and write address registers of block 302-14 which are modified by signals generated by the circuits of block 302-7. Also, these WA and RA registers supply signals indicative of the number of words stored which are used to determine the status of a transfer operation.

During a data transfer operation, the parity check and generation of circuits block 302-14 are operative to check the parity of the data signals received from the controller adapter via switch 302-6 and generate appropriate parity as required. It is also seen that switch 302-4 receives signals from the first pair of channel write data registers (W Reg 0, W Reg 1) which store two words of information for transfer from H switch 301-42 to either the registers 302-8 or directly to the controller adapter via the selector switch 302-10.

DETAILED DESCRIPTION OF OPERATION

With reference to FIGS. 1 through 16, the operation of the system of the present invention will now be described in connection with the execution of a read data transfer operation involving a disk device coupled to the channel section designated as CA0. It will be appreciated that preliminary to issuing commands to any module, the processor 200 will have initialized the different modules of FIG. 1 (e.g. module 300). Considering module 300, the processor 200 as part of an initialization sequence executes a series of WREX instructions fetched from memory module 500 which loads different ones of the registers of multiplexer 300.

FIG. 6 illustrates the format of the WREX instruction wherein the op code is coded to specify a write external register operation performed by the generation of a PI command. The GR1 field is coded to specify which one of the general registers of scratch pad memory 203-10 contains the information to be loaded into an external register designated by the address field.

The op code of the instruction is applied by instruction register switch 202-4 to memory 201-2 which causes the memory to reference one of the locations. The contents of the location are read out into register 201-4 and include a pair of addresses specifying the starting addresses in control store 201-10 of the microinstruction sequences required for instruction processing.

During a first phase of the instruction, the B switch 204-1 applies signals corresponding to the address field of the WREX instruction to the B operand inputs of adder/shifter 204-2 via the IL position of B switch 204-1 while the contents (ZEROS) of the scratch pad buffer 203-16 are applied via A switch 203-20 to the A operand inputs. The sum of the two operands which corresponds to the address field of the command word of FIG. 7a is transferred to working register R2. Following that, the general register location specified by the GR1 field of the WREX instruction is addressed via address inputs 203-14 and the data word contents are read out into the buffer 203-16.

During the execution phase of the WREX instruction, the PI command word formatted in the R2 register is applied to the WRP bus and loaded into the data out register 204-14 via the PI position of address switch 204-6 and the cross bar switch 204-8. The signals include one level or type of steering information (i.e. channel number — see FIG. 7a) to be transferred as part of the command used to select a portion of multiplexer 300, the processor number which identifies the port to which the processor connects as well as the identity of the processor. The SIU 100 supplies the processor identification number to processor 200 via a pair of lines, not shown. In the case of processor 200, the information is zero and therefore the PN bit 3 of the PI command word is set to a binary ZERO. Additionally under microprogram control, the processor 200 loads signals from reigister 201-15 and PSR register 204-20 via the PI position of steering switch 204-10 into bit positions 0-8 of steering register 204-16. These signals have the format of FIG. 14 and provide another level or kind of steering information for use by SIU 100 for transferring the PI command to multiplexer 300 or to the port (i.e. port A) to which the multiplexer 300 connects.

Following the loading of both registers 204-14 and 204-16, the processor 200 forces the AOPR line to a binary ONE which begins the signal sequence for transfer of the PI command to multiplexer 300. Also, the processor 200 increments the instruction counter (IC) and stores the result in working register R3. Then the processor 200 delays execution of the next microinstruction until it receives a signal via the ARA line from the SIU 100 indicating the acceptance of the request.

Figure 10A:
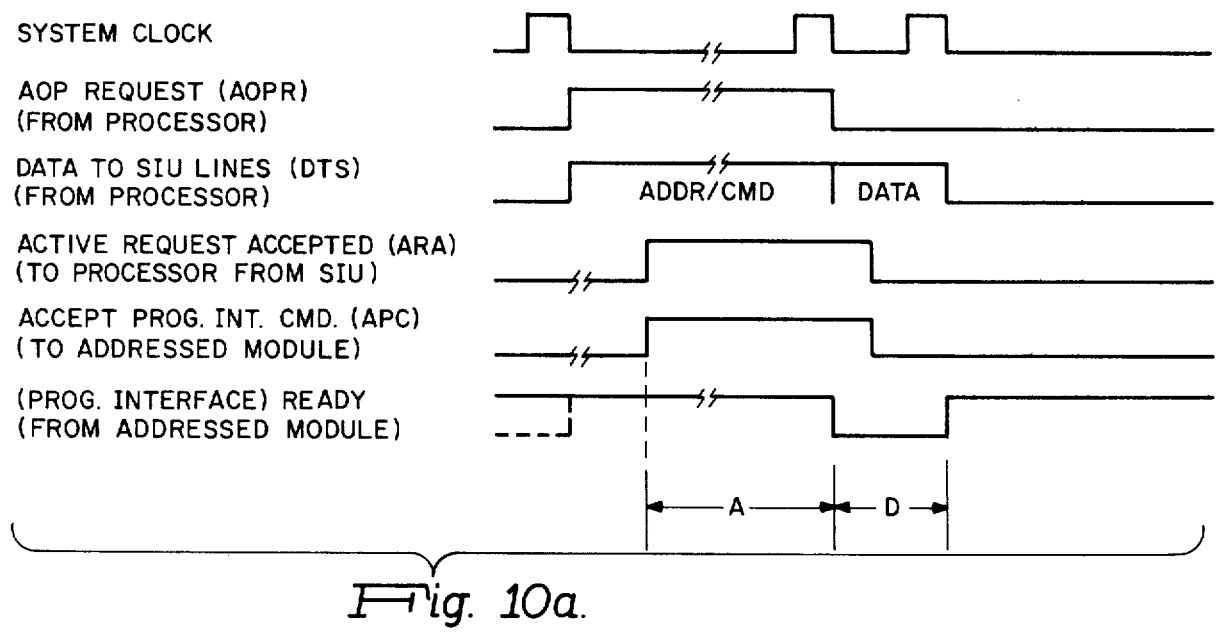
FIGS. 10a and 10b illustrate the signal sequences for transferring a WREX command.
Figure 10B:
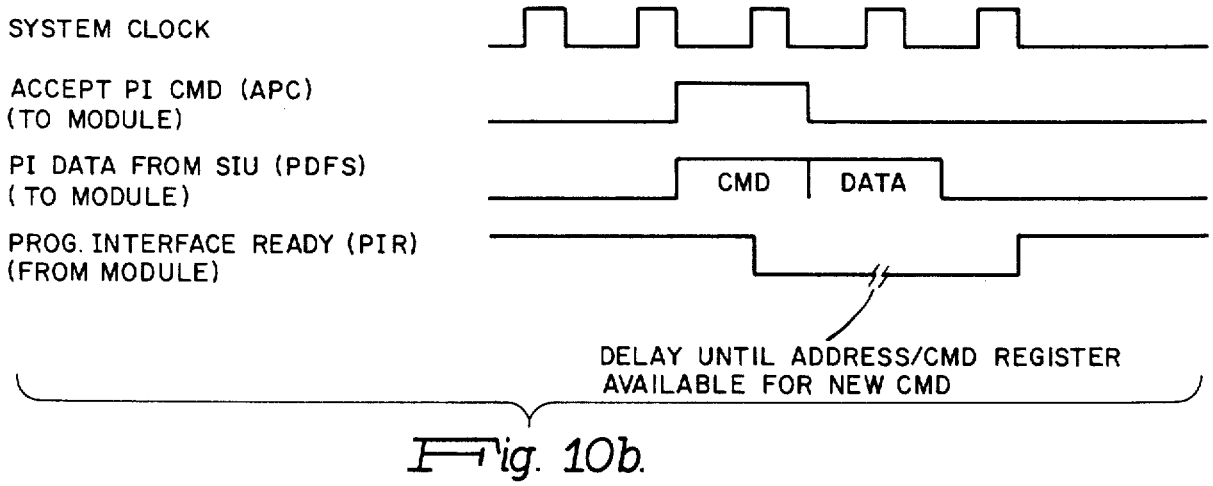

The signal sequence for command transfer is shown in FIG. 10a. The SIU 100 views the PI command as requiring a pair of SIU cycles, an address/command cycle followed by a data cycle designated A and D respectively in FIG. 10a. Assuming that the multiplexer 300 is ready to accept the PI command, the PIR line is a binary ONE. The SIU priority network 102-4 of FIG. 3b is operative to apply the command word via selector switch 102-2 to the PDFS lines of multiplexer 300 during the first cycle of operation. The processor 200 waits holding the information in the data out register 204-14 until the SIU 100 switches the ARA line to a binary ZERO. Simultaneously, the SIU 100 forces the APC line to a binary ONE signaling multiplexer 300 to accept the PI command.

Upon detecting the change of state in the ARA line, the processor 200 under microinstruction control completes the processing of the WREX instruction by transferring the data word formatted as shown in FIG. 7a from buffer 203-16 through the adder/shifter 204-2 via the adder/shifter position of switch 204-8 into the data out register 204-14. As seen from FIG. 10a, this word is presented to the SIU 100 during the first clock pulse after the processor 200 detects the change of state in the ARA line. The data word remains on the DTS lines until the occurrence of the next clock pulse at which time the operation is completed.

Referring to FIG. 4a, is it seen that the command word and data word are loaded into the PC register 302-2-and PD register 301-5 respectively via the PDFS lines. The circuits of block 301-4 decode the command signals and generate control signals which cause the data signals in the PD register 301-5 to be loaded into one of the ICB registers 301-10 and channel level registers 301-12 specified by the address field of the PI command word via the PD position of switch 301-6, driver circuits 301-8 and 301-15.

Upon completing the execution of four WREX instructions, all of the registers 301-10 and 301-12 will have been loaded with the appropriate signals identifying the group of interrupt control blocks to be used by each channel and the priority levels to be accorded to each of the possible 8 interrupt conditions which can occur on a channel. In a similar fashion, the mask registers 301-14 are preconditioned by PI commands, generated in response to another set of WREX instructions. When set, the contents of these registers enable the masking out of certain interrupt conditions. This avoids the processor 200 having to determine by "software" those interrupts to which it will respond and signal the multiplexer 300 of same.

Figure 15:
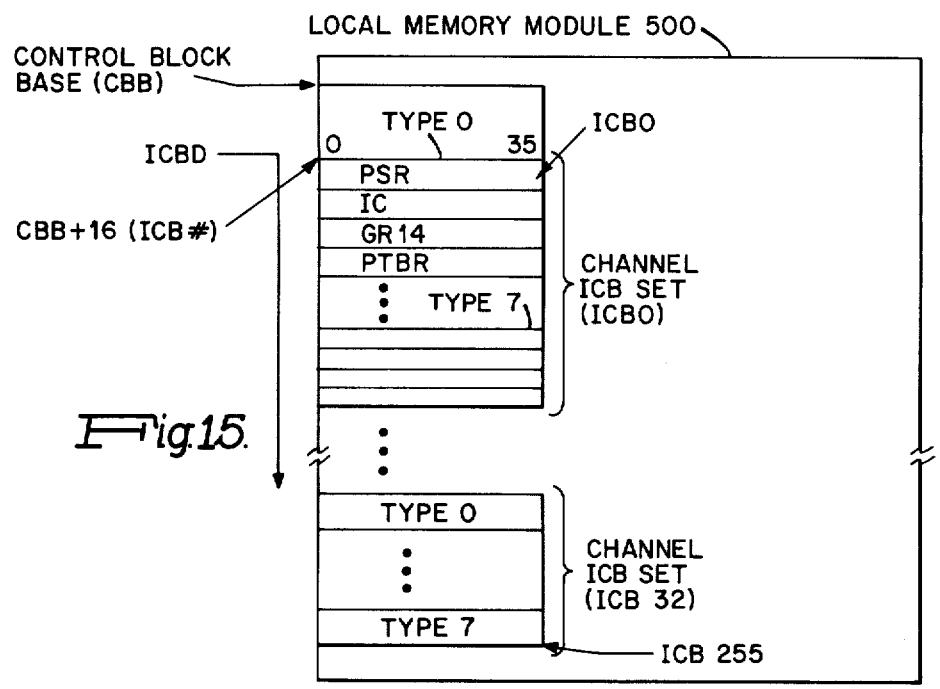
FIG. 15 illustrates an arrangement of interrupt control blocks in memory module 500 for multiplexer 300.

In the case of multiplexer 300, the groups of interrupt control blocks are in general defined by the type of devices. More specifically during the initialization of multiplexer 300, the channels connected to disk devices are assigned one set of ICB routines while the channels connected to tape devices are assigned a different set of ICB routines. However, it will be appreciated that both types of devices can also be assigned the same sets of ICB routines. Since the ICB number consists of the 5 bit ICBD number and the 3 bit type number, each set of ICB routines has eight routines, one for processing each type of interrupt. Thus the 32 sets of ICBs used in processing up to 256 interrupt vectors would appear in local memory module 500 as illustrated in FIG. 15. This arrangement by having the interrupting source specify the routine for processing the type of interrupt directly causes the processor 200 to enter a routine specially designed or tailored to respond to that event. This eliminates the normal overhead required for processing interrupts through inquiry programs. Moreover, the arrangement makes it possible to modify the ICB number when it is desirable to perform special operations such as test and diagnostic operations or those required for operating a device in a different mode (e.g. emulation).

As concerns the assignment of priority levels to the different types of channel adapter interrupts, this is determined by the real time urgency of the interrupt as mentioned previously. More specifically, a seek complete operation takes the disk device milliseconds to execute while a data transfer takes less than a millisecond to execute. Therefore, it is important for efficient system operation to have processor 200 process an interrupt signaling the end of a data transfer (i.e. data transfer termination interrupt) immediately in order to determine what other devices can start a data transfer so that the physical channel is made busy as much of the time as possible. Accordingly, the data transfer termination interrupt is given a higher priority than the seek complete which can be regarded as an off-line event. That is, the seek complete event signaled by the controller adapter means that the disk device has positioned its read/write heads on the desired cylinder. Therefore, whenever it is convenient, the controller adapter will determine whether that device is the device to be sent the next data transfer command.

As concerns the rotational position sensed interrupt, the controller adapter generates the interrupt to signal the processor 200 that a particular device is positioned closest to a desired sector. This establishes a priority for the processor 200 in selecting the next device for starting a data transfer operation. When the processor 200 receives this type of interrupt, it has normally less than a millisecond in which to start the next operation. Since timing is very critical in this instance, this interrupt is assigned a higher priority than those previously mentioned. Hence, the priority levels for a disk device, as mentioned, are hardware detected faults EV4 highest, rotational position sensed EV5, next highest, data transfer termination EV6 next to lowest and seek complete EV7 lowest. Since hardware detected faults disable further operations, this event has the highest priority.

Because it is particularly desirable to be able to connect different types of controller adapters and devices to the different multiplexer channels, the arrangement of the present invention facilitates such changes. Moreover, the arrangement makes it possible to modify the priority levels assigned to the different types of events when an event of one controller adapter requires a higher priority than the same event of another controller adapter. Thus, depending upon where the controller adapter is located, there may be different time requirements for the same events. Differences in speeds and track formats may also require different EV5 and EV6 priority levels. Other differences will also occur to those skilled in the art.

Following the execution of the WREX instructions, the multiplexer 300 is sufficiently preconditioned for processing interrupts received from any one of the four controller adapters 303-306. It is assumed that the host processor 700 is going to execute instructions which cause the processor 200 to condition channel CAO to perform a read data transfer operation involving a specified one of the disk devices connected to controller adapter 303.

As mentioned previously, each channel section includes a mode register 302-5. The first four bit positions of register 302-5 are coded to define channel operation and the next four bit positions are coded to define the controller adapter operation. In the present example, the processor 200 executes another WREX instruction which generates a PI command for loading mode register 302-5. The command and data words are loaded into the PC register 301-2 and PD register 301-5 respectively.

The command word stored in the PC register 301-2 includes an address coded to designate and specify the channel mode register 302-5 as the register to be loaded with the data word signals. The circuits of block 301-4 are conditioned to generate signals for transferring the data signals in PD register 301-5 via the PD position of switch 301-6, driver circuits 301-8, the DTA switch to WD switch 302-4 of FIG. 4b. The channel number signals stored in PC register 301-2 are coded (all zeros) to select the DTA position of the appropriate channel WD switch (i.e. switch 302-4) which enables the data word to be loaded into the channel mode register 302-5.

The first bit position of mode register 302-5 is coded to specify whether the channel is to operate in a direct or indirect data transfer mode, the second bit position defines whether the channel is to perform a read or write operation, the third bit position defines whether the operation is data control word (DCW) controlled or non data control word (DCW) controlled and the fourth bit position defines whether the operation to be performed is a test mode of operation. It is assumed that the bits mentioned are coded to specify indirect read, DCW control and normal operation as explained herein.

Following the loading of the channel mode register 302-5, the processor 200 executes a further WREX instruction which generates a PI command to start the controller adapter 303. The command word is coded to specify the transfer of signals corresponding to the command word to the controller adapter 303 (i.e. bit 28=1). More specifically, the command word stored in PC register 301-2 conditions the circuits of block 301-4 to generate signals which transfer command signals via the PC position of switch 301-6, then CAO DTA switch to driver circuits 301-2, the DTA position of WD switch 302-4 to D switch 302-10. The command signals are forwarded to the controller adapter 303 via the WD position of D switch 302-10 on the DTA lines of the CA interface 300-1.

Assuming that the PI command specifies a load register operation, the command word stored in PC register 301-2 also conditions the circuits of block 301-4 to generate signals which transfer the data word stored in PD register 301-5 to the controller adapter 303 via the DTA lines. The data word is coded to contain mode information to be loaded into a mode register included in the adapter which is similar to the channel mode register and conditions the controller adapter 303 for the operation it is to perform.

Upon completing the conditioning of the controller adapter 303 and the channel 302, the processor 200 is ready to signal the start of the data transfer operation. To perform a data transfer, the channel requires further information when operated in an indirect mode. That is, in the indirect mode, the multiplexer 300 controls the transfer of data with the controller adapters connected to it. Therefore, DCWs must be furnished to the channel and include information regarding the memory location of the data, the amount of data to be transferred and the mode of of transfer. By contrast, in the direct mode, the controller adapter transfers memory addresses, commands and steering information to a channel which is in turn forwarded by multiplexer 300 to memory module 500 via SIU 100.

The list of DCWs whose integrity is verified by the processor 200 comprises a channel program stored in local memory module 500. The address of the list is included within a list pointer word (LPW) of the channel program.

To initiate channel operation, the processor 200 executes a further WREX instruction which generates a PI command specifying the loading of the LPW register of the channel (i.e. CAO). The command word subsequently loaded into PC register 301-2 conditions the circuits of block 301-4 to generate signals which transfer the data word contents of the PD register 301-5 via the PD positions of switch 301-6 and 301-42 and the HSW position of CW switch 301-44 into the LPW register of the channel selected in response to stored signals in PC register 301-2.

Figure 7C:
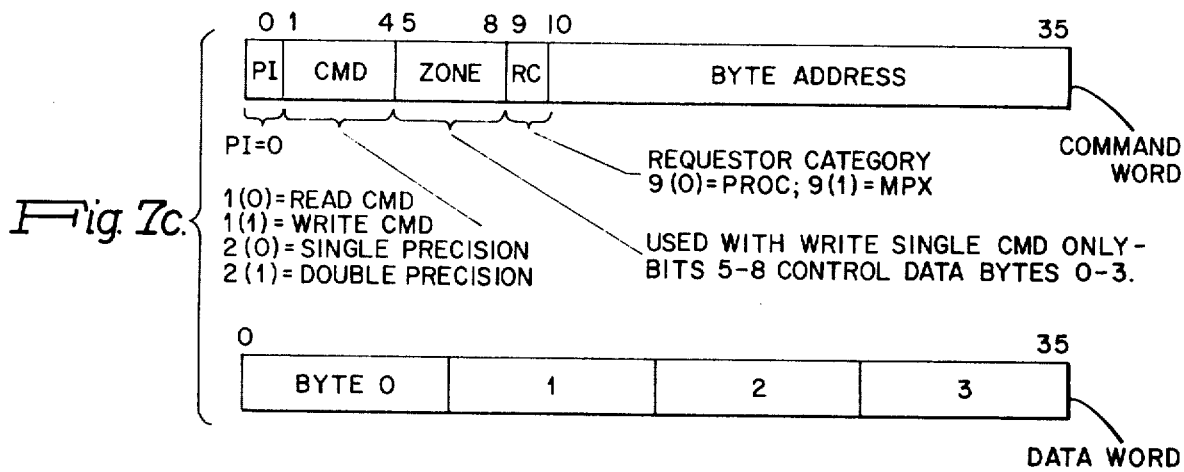
Figure 8A:
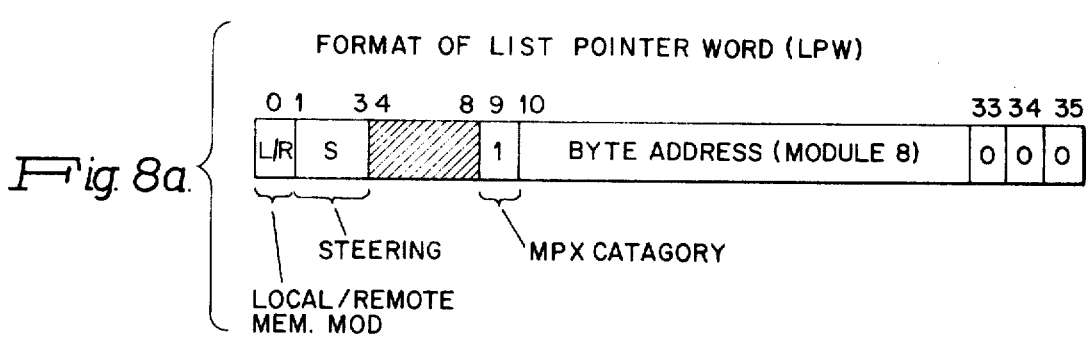
FIGS. 8a and 8b illustrate the formats of certain channel control words.

The LPW register now contains an address which points to the list of DCWs. The format of the LPW is shown in FIG. 8a. Following the loading of the channel LPW register, the processor 200 executes another WREX instruction which generates a PI command specifying a load control operation which indicates that the data word stored in the PD register 301-5 is going to be ignored. The PI command word is coded as shown in FIG. 7b.

The command word stored in PC register 301-2 conditions the circuits of block 301-4 to generate signals which transfer signals from PC register 301-2 via the PC position of PD switch 301-6 and the DTA position of WD switch 302-4 into a group of channel control flip-flops 302-3. One of the flip-flops is an AUTO flip-flop which is set to a binary ONE in accordance with bit 35 of the PI command word (i.e. see FIG. 7b). When set, this signals the channel to start transferring data.

The AUTO flip-flop causes a first list signal to be applied as one of the four inputs to the priority select and control circuits 301-48 together with a service request signal to one of the pair of two request lines from the channel. The circuits 301-48 select the channel having the highest priority of those requesting service which in turn causes the four inputs to the channel to define which of the registers are to be selected. The priority circuits 301-48 encode the CAO service request signal into a 2 bit code (CA0=00) which is applied to circuits 301-4. Assuming no other operation in process which prevents granting of the request (i.e. no data being transferred from memory module 500), circuits 301-4 apply enabling signals to circuits 301-48. The circuits 301-48 are operative to apply a binary ONE signal to the service ANS line of channel CAO. This signal readies the channel CAO for the data transfer.

The list signal forwarded from the channel CAO via the circuits 301-48 causes the circuits 301-4 to select the LPW position of C switch 301-50. Signals corresponding to the two bit channel code and the list signal are loaded into the first three bit positions of register 301-65. The two high order bit positions of the register 301-65 identify the channel requesting data. As seen from FIG. 4a, the contents of register 301-65 are applied to the MITS lines. Signals from the channel select lines from 301-48 cause the selection of the LPW register for the channel CAO.

The address in the LPW register is loaded into the ZAC register of bank 301-64 selected in response to signals from circuits 301-4 via the CSW position of the DT switch 301-20 selected in response to signals applied by the circuits 301-48. Additionally, the circuits 301-48 apply signals via the zone/CMD switch position of the ZAC switch 301-61 which are loaded into the first byte position of the ZAC register. This results in the formatting of a ZAC command word such as is shown in FIG. 7c. The signals applied from different ones of the four channel inputs (e.g. direct or indirect mode, read or write command, single or double precision and list define the state of the command portion of the ZAC command word. Since multiplexer 300 generates only ZAC commands, bit position 0 of the ZAC register is at ZERO. Since this is a list service, the bits of the command portion are coded to define a read double precision command.

During the loading of the ZAC register, the LPW address is applied to the pair of adder networks 301-52 and 301-54 where it is incremented by 2 (two words or eight bytes), new parity is generated and the result is returned to the channel LPW register via the update position of CW switch 301-44. Additionally, the steering information included within the LPW register is loaded into steering register 301-60 via the CSW position of steering switch 301-59. The loading of the ZAC register caused AOPR flip-flop 301-69 to be switched to a binary ONE.

Figure 11A:
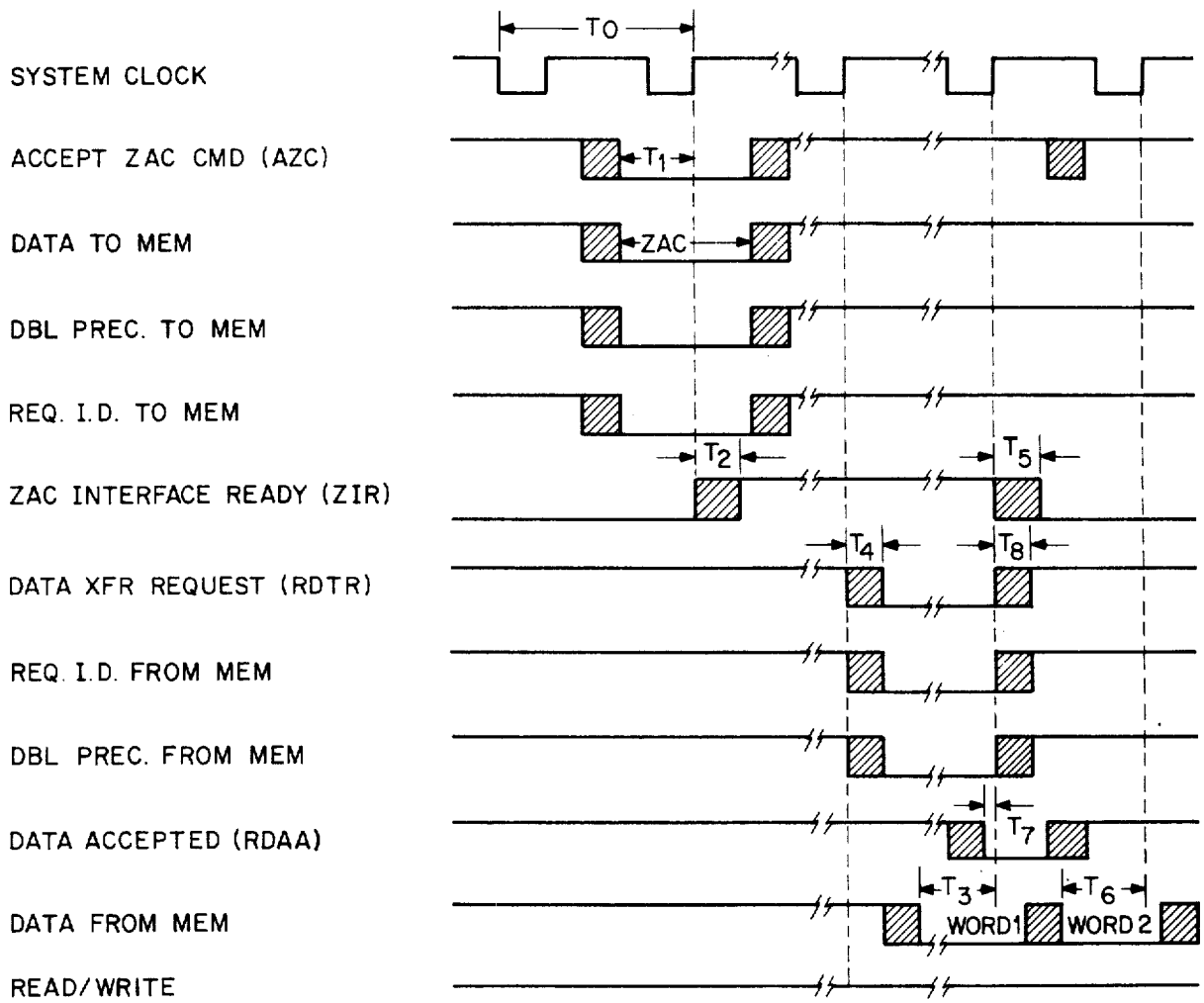
FIGS. 11a and 11b illustrate in terms of negative logic (e.g. binary ONE = negative transition) the signal sequences for performing memory read and write operations.

The multiplexer 300 waits until the SIU network 102-20 of FIG. 3b accepts the request signaled by the AOPR line by line ARA being forced to a binary ONE. The dialog signal sequence between the SIU 100 and local memory module 500 is as illustrated in FIG. 11a. Assuming the SIU 100 has accepted the request from multiplexer 300, it then forces the AZC line to a binary ONE which directs module 500 to initiate a data read/write cycle of operation. As indicated in FIG. 11a, coincident with setting the AZC line, the requestor I.D. signals, the ZAC command signals and double precision signal originating from multiplexer 300 are applied to the RITM lines, the DTM lines and SLTM lines respectively of interface 603 in response to signals from network 102-20.

As mentioned previously, the local memory module 500 retains the requester I.D. signals which it returns to SIU 100 as steering information with the data read. Referring to FIG. 11a, it is seen that the local memory module 500 responds by switching the ZIR line to a binary ZERO. This enables the SIU 100 to disable the requestor path. The local memory module 500 initiates the transfer of data to SIU 100 by forcing the RDTR line to a binary ONE in addition to placing the requester I.D. originating from multiplexer 300 and a double precision signal on the RIFM lines and the DPFM line respectively of interface 603.

The SIU 100 responds to the switching of the RDTR line by forcing the RDAA line to a binary ONE as shown in FIG. 11a. This signals the local memory module 500 that the path to requester module 300 is open and to proceed with the data transfer. The signal to the RDAA line also causes the module 500 to place a second data word on interface 603 at the trailing edge of the clock pulse following the receipt of the signals on the RDAA line as shown in FIG. 11a. At the completion of the operation, as soon as the module 500 is ready to accept another command, it switched the ZIR line to a binary ONE.

At the time of forcing the RDAA line, the SIU 100 notifies the requesting multiplexer module 300 that a data word is being applied to its DFS lines by forcing the ARDA line to a binary ONE. The SIU 100 also applies the requestor ID signals to the MIFS which results in the storage of the signals in register 301-68. The I.D. contents of register 301-68 applied to circuits 301-48 are decoded and cause the selection of the appropriate channel registers in addition to enabling channel CAO via a CAO select line. The first data word is loaded into the H register 301-40 via driver circuits 301-3. From there, the contents are loaded into the DT register of channel CAO via the H register position of switch 301-42 and the H register position of CW switch 301-44. The second data word which is applied a clock pulse following the first word is loaded into register 301-42 and thereafter transferred to the DA register 301-40 of channel CAO.

As mentioned previously, the signals from the circuits 301-48 establish the row of channel registers being selected (i.e CAO). Also, when the multiplexer 300 responds to the list request of channel CAO, the circuits 301-48 generate a signal which causes the channel circuits 302-7 of FIG. 4b to reset the list flip-flop to a binary ZERO. At that time, the circuits 302-7 force to a binary ONE state a channel busy flip-flop, not shown, which can be considered as a further control flip-flop. This in turn applies a binary ONE signal to the channel busy line of the CAI of controller adapter 303 signaling it that the channel is ready for the transfer.

Figure 8B:
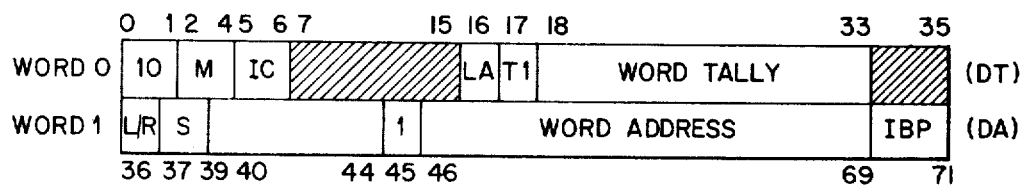

The formats of the two data words of the DCW loaded into the DT and DA registers are as shown in FIG. 8b. The DT register includes a bit position which indicates whether the first transfer of data to memory module 500 is a single or double precision transfer. It is assumed that this bit position is a binary ZERO indicating a double precision transfer.

Figure 12:
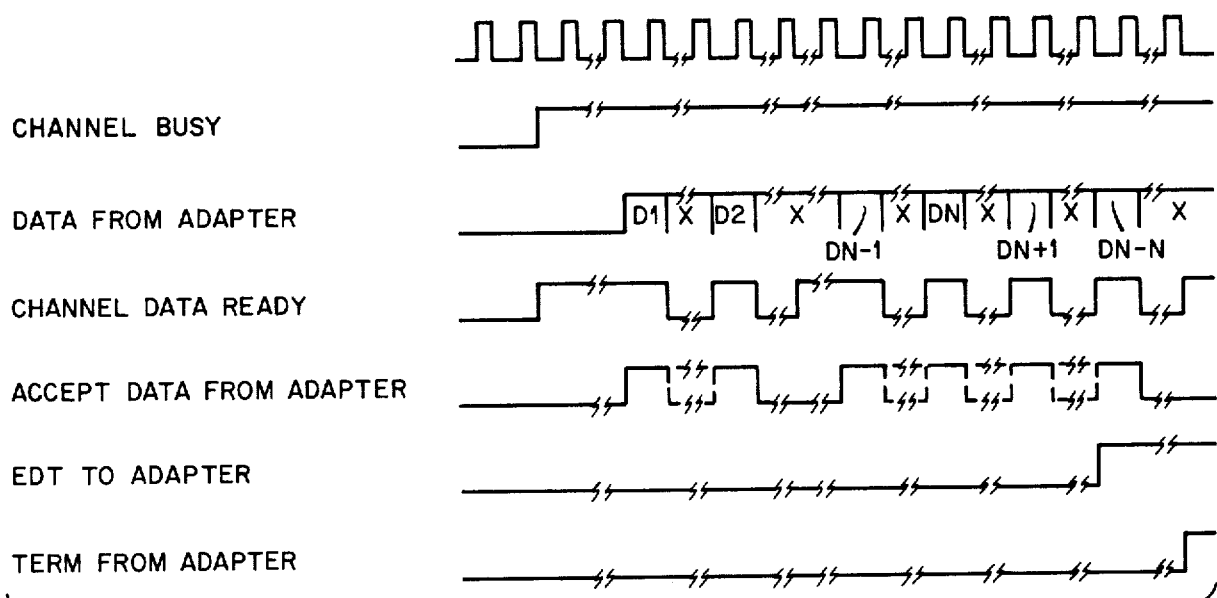
FIG. 12 illustrates the signal sequence of a device read data transfer operation.

The controller adapter 303 which as mentioned can be considered conventional in design performs a search operation for loading on the disk device previously selected by a previously issued seek command the data requested to be transferred to local memory 500. Upon locating the data, the controller adapter 303 is operative to start accumulating bytes read from the disk device and transferred thereto. When the controller adapter 303 has assembled a complete data word (i.e. 4 bytes), it forces its ADFA line to a binary ONE signaling the multiplexer 300 that the first data word is applied to the DFA lines and it should be accepted. The sequence of signals between the channel and controller adapter 303 is shown in FIG. 12.

Referring to FIG. 4b, the signal from the ADFA line conditions the circuits 302-7 to generate signals which select the DFA position of D switch 302-6 and loads the first word into D register 0 of bank 302-8. Since both the read and write address registers of block 302-14 are reset initially to ZEROS, D register 0 is selected. Since this is a double precision operation, the channel CAO waits until it has received the second word from the adapter 303. In the same manner mentioned, the channel CAO causes the second word to be loaded into the next register (i.e. D register (1)) of bank 302-8. It will be appreciated that the address stored in the write register is incremented by one after each word transfer. Upon detecting the presence of two words in register bank 302-8, circuits of block 302-7 cause the generation of a service request signal which is applied to the circuits 301-48 of FIG. 4a. The circuits 302-7 also force the channel input lines to signal a write double precision operation. At this time, the list line is a binary ZERO while the mode line will be still set to signal indirect mode.

Upon accepting the service request, the circuits 301-48 generate a code on the service select lines which are applied to circuits 301-4. The circuits 301-4 condition the circuits 301-48 to generate service ANS signals and a select signal to channel CAO. Also, the circuits 301-4 cause the DA position of the C switch 301-50 to be selected as the source of signals for loading the last three positions of the ZAC register of bank 301-64 and the steering register 301-60. The loading proceeds via the zone/CMD switch position of the ZAC switch 301-61, the DT switch 301-20 and the steering switch 301-59. Also, the first two bit positions of register 301-65 are loaded with ZEROS identifying channel CAO as the requester. Bit position 3 is a binary ZERO indicating no list service.

At that time, the AOPR line is forced to a binary ONE. During the same interval, during the second clock pulse following channel selection, the address (DA) is incremented by two by adder network 301-52 and returned to the DA register via the update position of the CW switch 301-44. Next, the DT register position of C switch 301-50 is selected, the data tally contents are applied to adder network 301-52, decremented by 2 and returned to the DT register via switch 301-44.

During the next clock pulse, the DT switch 301-20 is conditioned to select the CAO-DF position which enables the contents of data register (0) to be loaded into the Data (1) register of bank 301-64. Following channel selection, the channel CAO circuits 302-7 increment the read address register by one enabling the contents of the data register 2 to be loaded next into the data (2) register of bank 301-64.

Figure 11B:
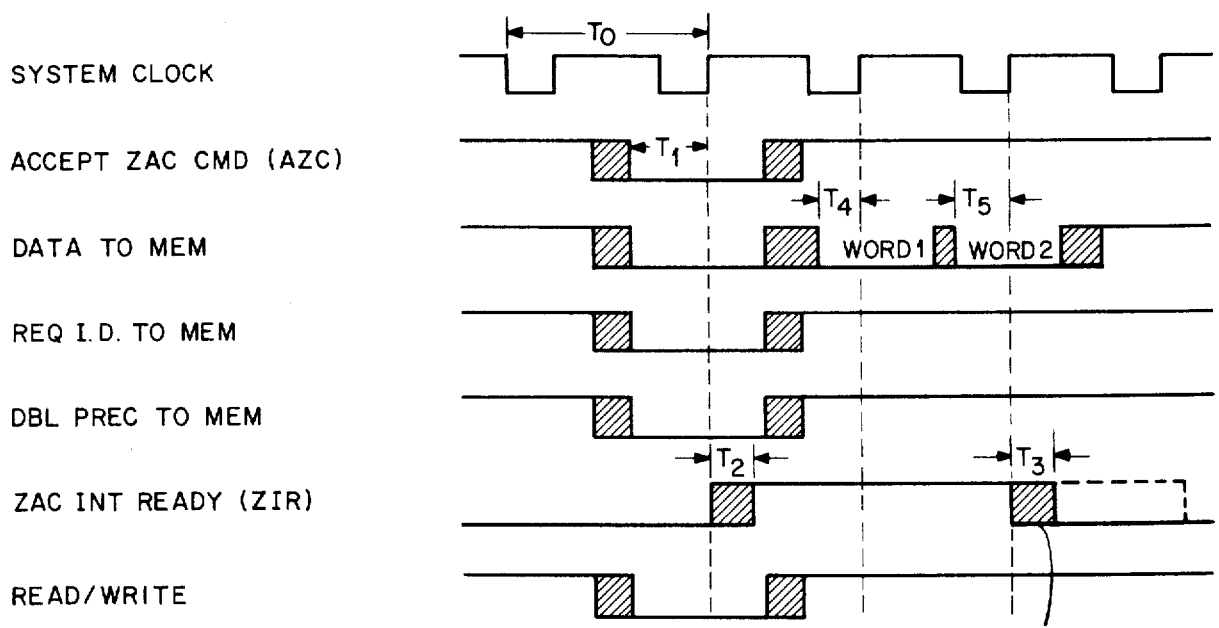

A signal sequence similar to that described above, is initiated for transfer by SIU 100 of the ZAC command having the format of FIG. 7c (i.e. the AOPR line is forced to a binary ONE when ZAC register is loaded). The signal sequence between the SIU 100 and memory module 500 for the double precision write operation is as shown in FIG. 11b. Referring to the Figure, it is seen that the write sequence is initiated in the same manner as the read sequence (i.e. SIU 100 forces the AZC line to a binary ONE. When the multiplexer 300 receives the signal indicating that the SIU 100 accepted the request, the circuits 301-4 are operative to cause the contents of the data register of bank 301-64 to be applied to the DTS lines. The memory module 500 responds by forcing the ZIR line to a binary ZERO.

The first word of data applied by multiplexer 300 on the DTS lines is placed on the DTM lines during the clock interval when the AZC line is switched to a binary ZERO. During the next clock interval, the contents of the data 2 register of bank 301-64 are applied to the DTS lines. This second word follows the first word as shown in FIG. 11b and completes the transfer of the two words to memory module 500.

The sequence described above and shown in part by FIGS. 11b and 12 continues until the data tally contents of the channel DT register decrements to zero. Assuming that the data tally contents upon being read out and decremented by 2 are detected to equal zero, this causes the adder network to force a counter zero signal to a binary ONE. At this time, the circuits 301-4 are conditioned to examine the state of bit 4 of the DT word to ascertain whether the transfer is complete (i.e. a disconnect or proceed). When bit 4 is a binary ZERO, the channel CA0 is conditioned to fetch another DCW from memory module 500 utilizing the contents of the channel LPW register. Assuming bit 4 is a binary ONE, this causes the circuits 301-4 to generate a signal to the channel CA0 indicating that the data tally ran out.

Upon receipt of the signal CTZ=0 from the circuits 301-4, the channel circuits 302-7 are operative to force the EDT line of the CAI to a binary ONE signaling that the transfer is complete (see FIG. 12). It will be appreciated that the controller adapter 303 completes the command (e.g. adapter completes the reading to the end of a sector if a full sector was not read, perform required checking operations, detect for errors, etc.). Assuming no errors, the controller adapter 303 upon completing all operations is operative to force a predetermined one of the four interrupt lines of the CAI to a binary ONE. The interrupt corresponds to a terminate interrupt which normally is an EV6 type interrupt.

The interrupt signal is applied as an input to block 301-34 of FIG. 4a. The interrupt signal causes the circuits of block 301-34 to generate a request and select the priority level signals stored in the CA0 level register of the highest priority interrupt (EV0-EV7) via the sixth position of multiplexer switch 302-28 to be applied to network 301-24 along with a request signal. Network 301-24 compares the three bit level code with priority level signals generated by any possible interrupts from the other channels CA1-CA3. The interrupt signal also causes the circuits 301-34 to generate a three bit type number (i.e. code of 110) which is applied as an input to the CA0 position of switch 301-35 together with the priority level signals from switch 301-28.

It will be appreciated that where controller adapter 303 forwards another type interrupt (e.g. EV4, EV5, or EV6), the circuits 301-34 are operative to select the priority level signals for another interrupt and not the level signals for the EV6 type interrupt. It is assumed that there are no other higher priority interrupts.

Assuming that the channel CA0 interrupt signal has the highest priority, this causes the network 301-24 to generate a two bit code (i.e. code of 00) which causes the contents of channel CA0 ICB register which contains the ICB number, and processor number, the level and interrupt type signals to be loaded into IDA register 301-22. The two bit code generated by network 301-24 representative of the channel number is loaded into the two high order bit positions of the IMID register 301-23. Since the controller adapter 303 connects to disk devices, there is no subchannel. Therefore, the low order bit positions of the IMID register is loaded with ZEROS. Also, the request signal forces its IR flip-flop to a binary ONE signaling the interrupt to the SIU 100.

Referring to FIG. 3a, it is seen that the IR signal is applied to the interrupt priority network 101-2. Network 101-2 is operative to decode the processor number and interrupt level request signals applied to the IDA lines. At that time, the network 101-2 checks the parity of the interrupt data and assuming no error, the level signals are applied to circuits which compare the level signals to the level of the process currently being executed by processor 200.

Assuming that the level signals of multiplexer 300 are higher, this causes the network 101-2 force the HLIP line to a binary ONE signaling the processor 200 presence of the higher level interrupt. Also, the network 101-2 generates an output signal at a predetermined one of its n output terminals which identifies the multiplexer 300 as the sources of the interrupt. The signal when applied to data selector circuit 101-8 causes the generation of a four bit code (i.e. 1101) which identifies multiplexer 300 or port A to which it connects as the interrupt source. The signal also causes data selector switches 101-4 and 101-14 to select as outputs, the level signals and steering signals applied to the IDA 0-3 lines and IMID lines by multiplexer 300.

As mentioned previously, the processor 200 executes interrupts at the completion of program instructions. The signal applied to the HLIP line causes logic circuits included in the control store address switch 201-14 to select the exception/interrupt position when the control bits contained within the CSA field of the microinstruction read out ot register 201-15 causes the selection of the standard sequence position of CSA switch 201-14. The signals applied to the input terminals of the exception/interrupt position cause an address of an interrupt sequence to be applied to control store 201-10 instead of the next instruction standard sequence.

Under control of the interrupt sequence, processor 200 applies signals corresponding to the contents of PSR register 204-20 via the PSR position of switch 204-24, the PSR/PCR position of X Bar switch 204-8 into working register R1 of bank 204-12. The contents are transferred into scratch pad location GR0 via the WRP bus.

Additionally, processor 200 requests interrupt data from SIU 100 by forcing the IDR line to a binary ONE and then delays execution of the next microinstruction until receiving a response from SIU 100.

Figure 9:
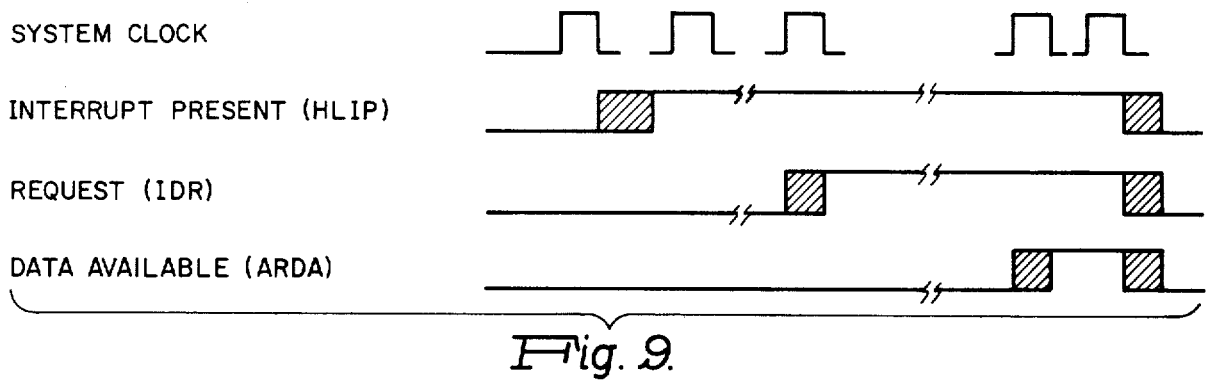
FIG. 9 illustrates the signal sequence for processing an interrupt.

The SIU 100 upon receipt of the IDR signal loads the new interrupt level into ALL register 101-6 and applies the interrupt data word signals to the DFS lines of the processor's interface 600. At the same time, SIU 100 forces the ARDA line to a binary ONE to signal processor 200 that the data interrupt word has been applied to the DFS lines. The signal sequence just described is illustrated in FIG. 9.

Figure 13:
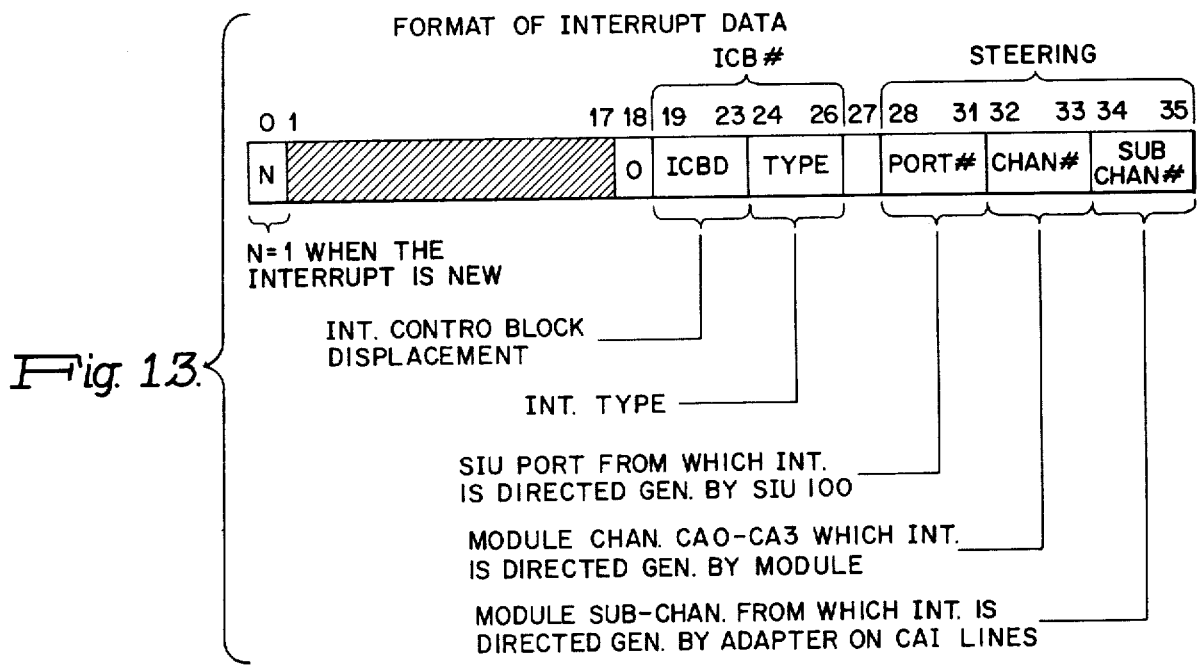
FIG. 13 illustrates the format of an interrupt data word.

The format of the interrupt data word is shown in FIG. 13. Referring to the Figure, it is seen that the steering information provided to processor 200 is generated by circuits included within the multiplexer 300 and the SIU 100 based upon the physical location of the interrupt source in the system of FIG. 1.

Referring to FIG. 2, it is seen that the ARDA signal causes the interrupt word to be loaded into the data in register 204-18. At that time, SIU 100 is operative to remove the data from the DFS lines. Additionally, the processor 200 upon receipt of the ARDA signal is operative to reset the AOPR line to a binary ZERO.

Next, processor 200 under microprogram control fetches the control block base (CBB) from scratch pad location zero during the time the interrupt data word is loaded into data in register 204-18. The interrupt word ocntents are transferred via the DI position of B switch 204-1 through the adder/shifter 204-2 via the adder/shifter position of switch 204-8 into working register IC of register bank 204-12. Also, the scratch pad address register 203-12 is forced to ZEROS to read out the CBB contents from scratch pad 203-10 into buffer 203-16.

Because it is assumed that this is a new interrupt, the primary CBB must be aligned by shifting the CBB left 11 bit positions. The CBB is applied to the A operand input of adder/shifter 204-2 via the SPB position of A switch 203-20. The result is transferred via switch 204-8 into working register R2. It will be appreciated that in the case of an old interrupt, the contents of the PSR and IC scratch pad locations can be used directly.

Under microprogram control, processor 200 forms the ICB address by first applying the interrupt data contents of the R1 working register via the WRR bus and the WRR position of the A switch 203-20 to adder/shifter 204-2 where they are shifted right by 9 bit positions and loaded into working register R2. which stores CBB # 1. The shifting removes the ICB number from the interrupt data word. During the same cycle, the contents of working register R2 are then transferred via the WRP bus to buffer 203-16. Next, the ICB number contents from buffer 203-16 are applied via A switch 203-20 to adder/shifter 204-2 and shifted left by 4 bit positions. The shifted result is then loaded into working register R2. The shifting operation is effective to multiply the ICB number by 16. The adder/shifter 204-2 is operative to sum or combine the contents of the buffer 203-16 applied via the A switch 203-20 and the contents of working register R2 applied via B switch 204-1. The result which identifies the address of the ICB in local memory module 500 is loaded into working register R2. As mentioned with reference to FIG. 15, the type of interrupt defines the particular ICB routine which is to process the data transfer termination interrupt received from multiplexer 300. The ICB in turn identifies the process which the processor 200 executes at the level specified by the signals applied by the SIU 100 to the AIL lines. As mentioned previously, any one of the 256 processes may be run at any of one of eight different levels. Thus, the arrangement enables execution of up to eight different processes concurrently or several processes at multiple levels.

Under microprogram control, the processor 200 initiates a read double operation for fetching a double word of the ICB (i.e. PSR and IC) from module 500 using the ICB address stored in working register R2. The ICB address together with other information is loaded into data out register 204-14 from the R2 register via the ABS position of address switch 204-6 and the WRP bus (i.e. ZAC command generated). Additionally, steering register 204-16 is loaded via the R/W position of steering switch 204-10 and processor 200 forces its AOPR line to a binary ONE to signal SIU 100 of a memory request. Also, the ICB address is incremented by 8 and returned to working register R2. The processor 200 then delays execution of further microinstructions until the SIU 100 signals acceptance of the request (i.e. network 102-20 forces the ARA line to a binary ONE).

Next, processor 200 loads the contents of the PCR register 204-22 into working register R3. At this time, working registers R1, R2 and R3 store the interrupt word, the ICB address plus 8 and PCR contents respectively. The PCR contents stored in the working register R3 are checked to determine that there was a response from SIU 100 on the ARA or ARDA line. Assuming normal operation (i.e. no exceptions), the processor 200 under microprogram control is operative to generate another double read request to memory module 500 for fetching the next two words of the ICB.

During the checking of the PCR contents, the PSR and IC words from memory module 500 are transferred to data in register 204-18. The first word (i.e PSR) is transferred via the DI position of B switch 204-1 and adder/shifter 204-2 to working register R3. The second word (i.e. IC) is loaded into the IC working register.

The processor 200 under microprogram control performs operations necessary to load the interrupt word steering into PSR register 204-20. First, the PSR contents of working register R3 are shifted left by 8 bit positions. This eliminates the steering field included in the left most byte of the word since it has no significance to the processing of the interrupt. The result is then transferred to working register R3. The interrupt work contents of working register R1 are transferred to buffer 203-16 via the WRP bus. It will be noted that bits 28-35 include the steering information generated by SIU 100 and multiplexer 300 to be inserted into PSR register 204-20.

During a next cycle of operation, the contents of working register R3 are applied via WRR bus and the WRR position of B switch 204-1 to the B operand input of adder/shifter 204-2 while the contents of buffer 203-16 are applied via the SPB position of A switch 203-20 to the A operand input of adder/shifter 204-2. The A operand and B operand are concatenated and aligned by the shifter to form the new PSR which is transferred to working register R1.

The processor 200 delays execution of further microinstructions until receipt of the next two words of the ICB. Upon receipt of the ARDA signal from the SIU 100, the processor 200 transfers the new PSR contents of working register R1 into PSR register 204-20 via the WRR bus. During subsequent cycles, the words from the ICB loaded into data in register 204-10 are transferred into the appropriate scratch pad register locations (e.g. GR14 and PTBR addresses). Thereafter, the processor 200 fetches instructions of the program started by interrupt processing routine using the IC working register contents.

From the above, it is seen that by requiring the processor 200 to insert into the PSR register steering information generated by the SIU 100 and multiplexer 300, any PI commands generated in response to user issued WREX and RDEX instructions executed as a consequence of entering processes resulting from the interrupt are directed automatically to multiplexer channel identified by the hardware generated steering information. As previously discussed, processor 200 upon generation of each PI command automatically inserts steering information obtained from PSR register 204-20 into steering register 204-16 and into the data out register 204-14. The steering data inserted into steering register 204-16 has the format shown in FIG. 14 while the steering data inserted as part of the PI command is formatted as shown in FIG. 7a.

It will be appreciated that any time a user instruction of the process entered causes an all ZERO address to be loaded into write address register 203-22 and selected for transfer to address register 203-12, decoder circuit 203-28 is operative to generate an exception signal unless bit position 8 of the PSR register 204-20 is set to specify master mode. The exception signal in turn forces bit position 4 of the PCR register 204-22 to a binary ONE signaling the illegal operation along with causing processor 200 to enter automatically an exception processing routine referenced in the manner mentioned previously. It will be appreciated that certain other scratch pad locations can be also protected from unauthorized access by users.

Figure 16:
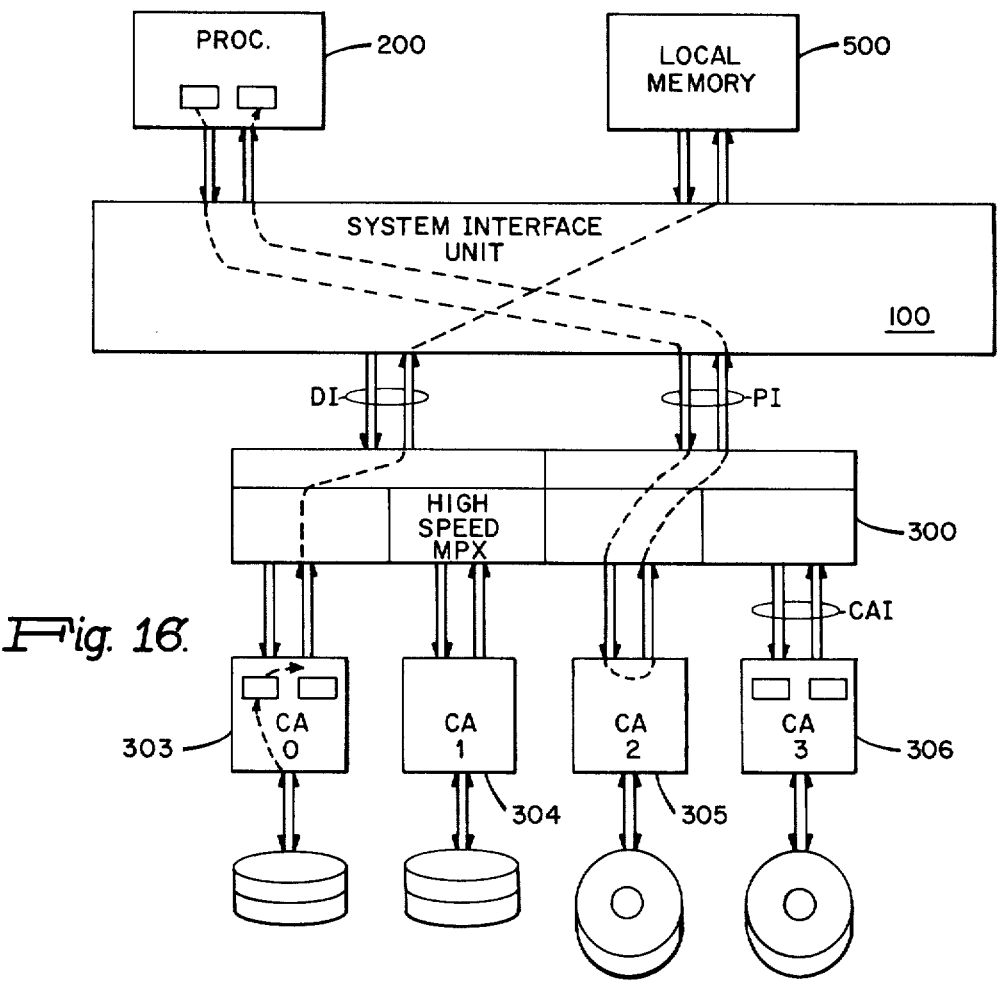
FIG. 16 illustrates diagramatically concurrent data transfers within multiplexer 300.

Referring to FIG. 16, it will be noted that multiplexer 300 can execute other operations concurrent with the read data transfer operation just described. As illustrated in the Figure, during the time that controller adapter CAO is receiving data bytes from the disk device and having the bytes it assembles written into local memory module 500 via its channel, the processor 200 in response to a RDEX instruction issues a PI command via the programmable interface specifying that the contents of one of the controller adapter registers (i.e. CA2) be returned to the processor 200.

Figure 10C:
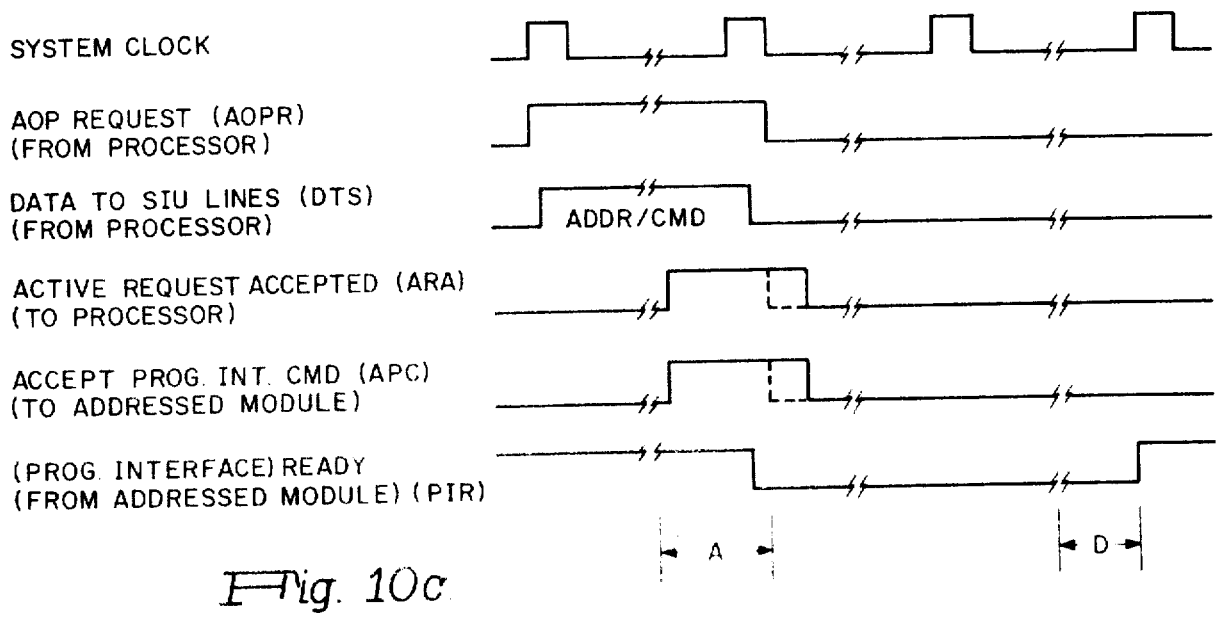
FIG. 10c illustrates the signal sequence for a RDEX command execution.
Figure 14:
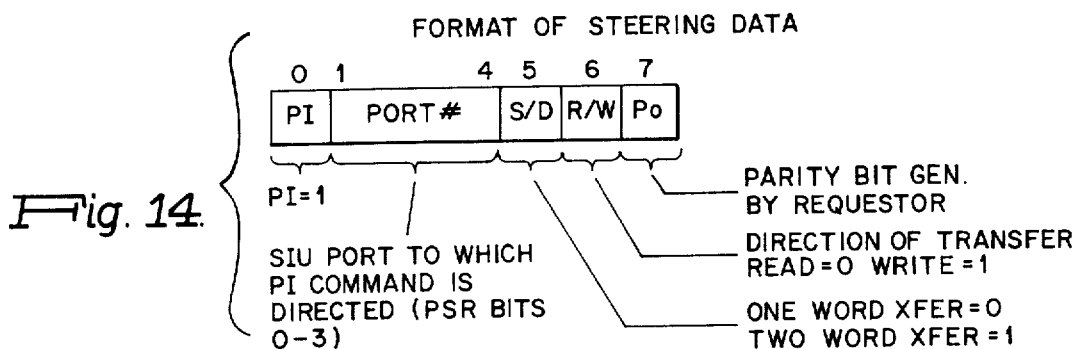
FIG. 14 illustrates the format of one type of steering data.

In a manner similar to that described in connection with a WREX instruction, processor 200 generates a PI command formatted as shown in FIG. 7a which is loaded into data out register 201-14 together with steering information formatted as shown in FIG. 14 being loaded into steering register 204-16. The signal sequence for transferring the PI command from processor 200 to multiplexer 300 via SIU 100 is shown in FIG. 10c. Referring to the Figure, it is seen that the address (A) and data (D) cycles may not be executed on successive cycles since SIU 100 does not reserve a data path over which multiplexer 300 can transmit the contents of the specified data register to processor 200. Thus, it is the responsibility of the addressed module (multiplexer 300) to request a data cycle by forcing its RDTR line to a binary ONE. When multiplexer 300 is the highest priority requester, it is granted a path.

Figure 10D:
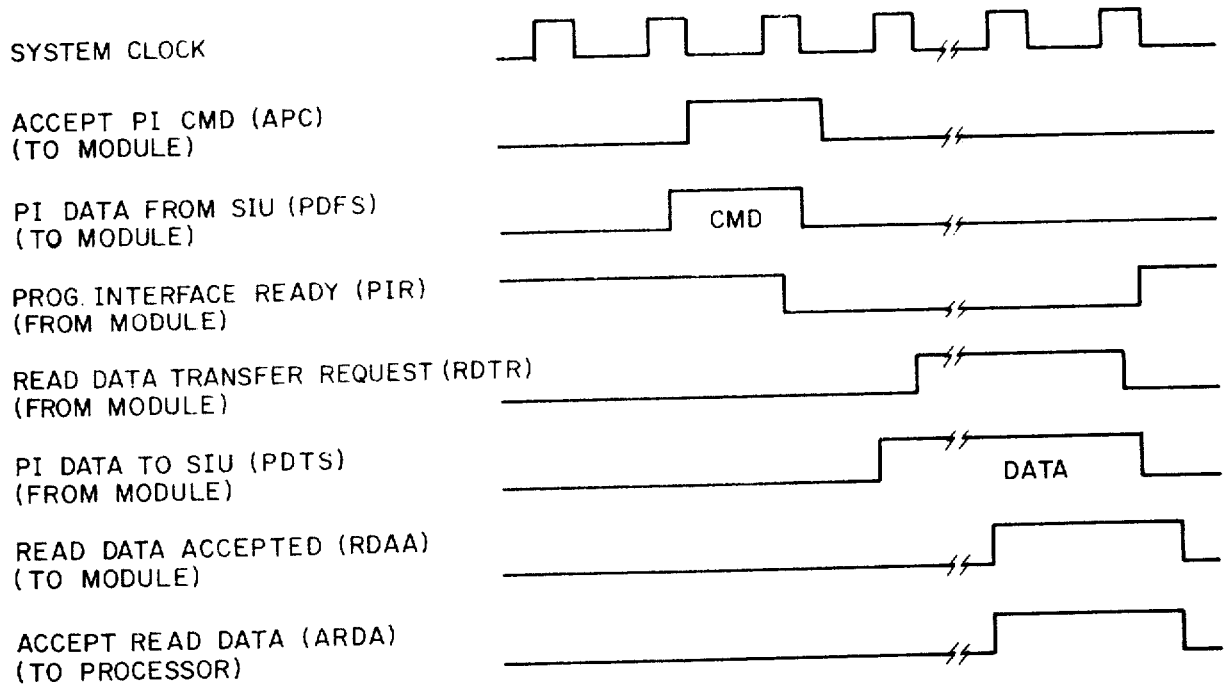
FIG. 10d illustrates the signal sequence for a RDEX command execution.

In greater detail, the signal sequence for transferring the contents of the register specified from multiplexer 300 to processor 200 is as shown in FIG. 10d. The data word transferred by multiplexer 300 will have a format similar to the formats shown in FIG. 7d. As soon as signals corresponding to the data contents of the specified register have been loaded into the PDTS register of bank 301-64 via DT switch 301-20. This causes the circuits 301-4 to force the RDTR line to a binary ONE via setting a flip-flop not shown. At that time, the contents of the PDTS register are applied to the PDTS lines of the interface 601. When SIU 100 accepts the request of multiplexer 300, network 102-40 of FIG. 3b forces the RDAA to a binary ONE acknowledging acceptance to multiplexer 300. At that time, multiplexer 300 can remove the data word and reset the request flip-flop.

As seen from FIG. 10d, the SIU 100 simultaneous with switching the RDAA line also switches the ARDA line to a binary ONE. This signals processor 200 that the register contents applied to the PDTS lines are present on the DFS lines of processor interface 600. Upon the occurrence of a next clock pulse, the operation is completed. When multiplexer 300 is unable to store PI read commands, it operates to hold the PIR line to a binary ZERO signaling the SIU 100 that it is not ready for another command.

From the foregoing, it is seen how the multiplexer 300 can accommodate two different types of operations concurrently utilizing the arrangement of the present invention. It will also be appreciated that multiplexer 300 can also accommodate additional data transfer operations where there are other memory modules (e.g. main memory) which connect to other ports of SIU 100.

From the foregoing, it is seen that the system of the present invention provides for efficient processing of interrupts wherein the processing time expended in switching between programs is minimized. This is accomplished through the use of commands which precondition different ones of the modules which connect to peripheral devices of the system enabling such modules to assign appropriate priority levels to different events. In this way, the module is able to distinguish important events from less important events and cause the system processing unit to be interrupted only in the case of higher priority activity. Additionally by having each module generating an interrupt request designate the interrupt routine to be used in processing the interrupt eliminates the need for the processing unit to expend time in ascertaining the reason for the interrupt in addition to its relative importance.

The system of the present invention by providing a separate interface for transmitting commands also makes it possible for a module to execute data transfer operations in parallel with the execution of commands applied by the separate interface.

It will be appreciated that many changes may be made to the system illustrated without departing from the spirit of the present invention. For example, while the preferred embodiment of the system employing the principles of the present invention described the preconditioning of system modules by commands applied by separate interface, the system may be utilized to apply such commands from other interfaces in the system such as the data interface. More specifically by selecting the DFS position of switch 301-1 of FIG. 4a, commands could be applied from the DFS lines rather than from the PDFS lines. Alternatively, as in the case of the low speed multiplexer, commands and data can be transmitted using only the programmable interface. Thus, where concurrentcy is not essential to system operations, the number of interfaces can be reduced with a corresponding decrease in costs.

It will also be appreciated that changes can also be made to the system for facilitating greater concurrentcy in system operations by including in processor 200 additional logic circuits for generating PI commands in parallel with memory commands. Additionally, instead of having the op code of the instruction define the type of interface over which the processor is to transfer a command, additional bits included within the memory address portion of an instruction could be coded to define the interface. More specifically, the upper address bits of the address would serve as a tag and specify an address outside the normal addresses which would correspond to an external register address. This would eliminate the need for having different types of instructions control both data and command interfaces. It will also be noted that while the system of the preferred embodiment disclosed the interrupt priority apparatus as being included in the system interface unit, such apparatus for the purpose of the present invention could also have been made a part of the processor. Other changes which could be made to the system of the present invention without departing from its teachings will also be apparent to those skilled in the art.

To prevent undue burdening the description with matter within the ken of those skilled in the art, a block diagram approach has been followed, with a detailed functional description of each block and specific identification of the circuits it represents. The individual engineer is free to select elements and components such as flip-flop circuits, registers, selector circuits, multiplexers from the individual's own background or available standard references or documents referenced herein.

While in accordance with the provisions and statutes, there has been illustrated and described the best form of the invention known, certain changes may be made to the system described without departing from the spirit and scope of the invention as set forth in the appended claims and that in some cases, certain features of the invention may be used to advantage without a corresponding use of other features.

Having described the invention, what is claimed is:

1. An input/output system for controlling input/output data transfer operations of a plurality of peripheral devices, said system comprising:
    a memory means;
    processor means, said processor means including means for generating commands during said data transfer operations involving said plurality of peripheral devices;
    multiplexer means;
    means interconnecting said memory means, said processor means and said multiplexer means for comminction on a priority basis;
    said multiplexer means including at least one adapter port coupled to said plurality of peripheral devices, said multiplexer means comprising:
    a plurality of registers arranged for storing interrupt control information transferred by said commands pertinent to the processing of said input/output operations by said multiplexer means;
    a first one of said registers containing coded signals specifying a numerical value used for identifying one of a plurality of interrupt routines executed by said processor means to process interrupt event signals received from said devices and a second one of said registers containing coded signals specifying numerical values for identifying a plurality of levels of priority to be given by said multiplexer means to said plurality of interrupt event signals received from said device;
    interrupt logic means coupled to receive said event signals from said adapter port;
    priority network means coupled to said logic means and to said second register, said priority means being operative to generate signals indicating the request having highest priority in accordance with interrupt event signals received from said logic means, said highest priority being defined in accordance with said values stored in said second register; and,
    output register means being operatively coupled to said priority network means and to said plurality of registers, said priority network means generating signals causing signals representative of the contents of said first register and one of said values stored in said second register corresponding to the event signal having the highest priority to be applied to said output register means for transfer to said interconnecting means as a part of an interrupt request.

2. The system of claim 1 wherein said interconnecting means includes:
    a data transfer interface bus coupled to said memory means, said processor means, and said multiplexer means; and,
    a command interface bus connected to be independent of said data transfer bus, said command interface bus being coupled to said memory and said multiplexer means for receiving said commands from said processing means during said data transfer operations.

3. The system of claim 2 wherein said command interface bus includes a plurality of control lines operatively coupled to said processor means and wherein said processor means includes means for initiating a command transfer sequence over said control lines for transfer of said commands to said multiplexer means over said comand interface bus for modifying the contents of anyone of said plurality of registers during said data transfer operations.

4. The system of claim 3 wherein said processor means includes clocking means for generating timing signals, said clocking means being connected to said memory means, said interconnecting means and to said multiplexer means for synchronizing the communication of requests therebetween.

5. The system of claim 1 wherein said interconnecting means includes:
    priority network means coupled to receive interrupt requests from said multiplexer means, said priority network means being operative to determine the highest priority request defined by said priority level number signals and transfer said signals corresponding to said interrupt numerical value associated therewith to said processing means as part of said interrupt request.

6. The system of claim 5 wherein said memory means includes a plurality of storage locations for storing groups of interrupt routines for servicing a corresponding number of possible interrupt events; and
    said processor means including interrupt control means coupled to receive said interrupt requests, said interrupt control means including:
    an address register for storing control block base address of said groups of routines;
    a register for storing said numerical value signals of said interrupt routine received from said interconnecting means; and,
    adder means connected to said address register and to said register for combining said control base address with said numerical value to form an address identifying said particular group of said interrupt routines within said memory means.

7. The system of claim 6 wherein said processor means further includes:
    process control storage means containing groups of registers for storing process information for a corresponding number of process levels ordered from a low to a high priority with only one process level being active at any one time;
    said interconnecting means including means for transferring the priority level signals received from said multiplexer means; and
    said interrupt control means including selection means coupled to said process control storage means for selecting the group of registers for the priority level for executing the process specified by said interrupt routine.

8. The system of claim 6 wherein each group of interrupt routines in said memory means includes a number of interrupt routines for processing a particular type of interrupt event and
    wherein said interrupt logic means includes logic means operative in response to said interrupt event signals to generate coded signals identifying said type of interrupt event signalled, said logic means being connected to apply said coded signals to said output register means as part of said interrupt request.

9. The system of claim 8 wherein said register of said processor interrupt control means is arranged to store said coded signals together with said numerical signals and wherein said adder means is operative to combine said control base address with an interrupt control block number consisting of said numerical signals and said type number signals to form an address identifying a particular interrupt routine within said group for processing said type of interrupt event signalled.

10. The system of claim 9 wherein said second register stores sets of interrupt level number signals, one for each different type of possible interrupt event signals required to be processed during said data transfer operations, said multiplexer means further including:

output means being connected to receive different sets of interrupt level number signals from said second register, said output means being conditioned by said logic means to apply one of said sets of interrupt level number signals from said second register for indicating the priority to be accorded by said priority network means to a particular event signal associated therewith.

11. The system of claim 10 wherein said multiplexer means includes a plurality of output means and further comprises:

a plurality of channel sections, each having a plurality of registers associated therewith and each section being connected to a different adapter port;

a first register containing coded signals used to identify a routine for processing said interrupt event signals received by said channel section and a second register containing coded signals specifying numerical values for identifying levels of priority to be given by said multiplexer means to said plurality of interrupt event signals; and each said second register being coupled to said logic means and to a different one of said output means, priority network means, said priority network means being operative to generate signals indicating the channel section request having said priority defined in accordance with the selected sets of interrupt level number signals from said second registers.

12. The system of claim 11 wherein said logic means of said priority network means is operative in response to more than one interrupt event signal from the same channel section to generate coded signals identifying the event signal having the highest priority.

13. The system of claim 10 wherein said first and second registers of each of said channel sections contain coded signals defining the same and different routines used for processing said interrupt event signals.

14. An input/output system for controlling input/output data transfer operations of a plurality of peripheral devices, said system comprising:

a memory module;

a processor module including means for generating commands during said data transfer operations involving said plurality of peripheral devices;

a multiplexer module;

means interconnecting said modules for communication on a priority basis;

said multiplexer module coupled to said plurality of devices, said multiplexer module comprising:

a plurality of registers for storing control information transferred to said multiplexer module by said commands, a number of said registers being connected for storing coded signals specifiying constants used for identifying a number of interrupt routines executed by said processor module for processing module interrupt requests made in response to different types of event signals generated during said data transfer operations;

logic means coupled to receive event signals from said devices, said logic means being operative to generate coded signals designating the types of event signals received, said logic means being connected to said number of registers;

priority means coupled to said number of registers and said logic means, said priority means generating signals defining the highest priority event; and output register means being connected to receive signals representative of one of said contants from one of said number of registers and said coded signals selected in response to signals from said priority means for transfer to said interconnecting means as a part of an interrupt request.

15. The system of claim 14 wherein said interconnecting means includes:

a data transfer interface bus coupled to said memory means, said processor means, and said multiplexer module; and a command interface bus connected to be independent of said data transfer interface bus, said command bus being coupled to said memory module, said processor module, and said multiplexer module for receiving said commands and control information during said data transfer operations.

16. The system of claim 15 wherein said interconnecting means further comprises:

priority network means coupled to predetermined ones of said modules for receiving interrupt requests, said priority means being operative to determine the request having the highest priority and transfer and signals representative of a constant and type from said module to said processing means as part of said interrupt request.

17. The system of claim 16 wherein said multiplexer module further includes:

a second number of registers, each being operatively connected to said control interface bus for storing a number of sets of interrupt level number signals, each set for defining the priority of a different one of the possible event signals which can be applied as inputs to said logic circuit means, said second number of registers being connected to receive said coded signals from said logic means and apply one of said sets of interrupt level number signals from said each register to said priority means; and said priority means being operatively coupled to said second number of registers for selecting the set of interrupt level number signals corresponding to said highest priority event to be loaded into said output register means for transfer as part of said interrupt request.

18. The system of claim 17 wherein said priority network means of said interconnecting means includes means for receiving said interrupt level number signals from each of said predetermined ones of said modules, said network means being operative to determine said highest priority interrupt in accordance with said level number signals; and means connected to said priority network means for transferring to said processor module the level number signals associated with said highest priority interrupt as part of said interrupt request.

19. The system of claim 18 wherein said interrupt level number signals are coded to have values 000 through 111 corresponding to the highest to lowest priority respectively.

20. The system of claim 17 wherein said memory module includes:

a plurality of storage locations for storing groups of interrupt routines for servicing a corresponding number of possible interrupt events; and said processor module including interrupt control means coupled to receive said interrupt requests, said control means including:

a first register for storing a control block base address of said routines;

a second register for storing said constant and type signals received from said interconnecting means; and adder means connected to said first and second registers for combining said control base address with said constant and type signals to form an address identifying a specific one of said interrupt routines for processing said interrupt request.

21. The system of claim 20 wherein said processor module further includes:

process control storage means containing groups of registers for storing process information for a corresponding number of process levels ordered from a low priority to a high priority with only one process level being active at any one time;

said interconnecting means including means for transferring the priority level signals received from said multiplexer module; and said interrupt control means including selection means coupled to said process control storage means for selecting the group of registers for that priority level for executing the process specified by said interrupt routine.

22. A data processing system having addressable memory module means, processing module means including interrupt control means for processing interrupts using a number of interrupt routines stored in said memory module, at least one input/output multiplexer module means coupled to a plurality of peripheral devices for processing event signals received from said devices during transfers between said devices and said memory module means and system interface means interconnectable between each of said module means for establishing communication paths between pairs of said module means on a priority basis, said input/output multiplexer module means comprising:

a control interface coupled to said system interface means for receiving command signals generated by said processing module means during said transfers on said priority basis;

a plurality of registers operatively coupled to said control interface for storing signals applied to said control interface, said signals being coded to identify different ones of said interrupt routines and a number of sets of priority levels corresponding in number to the number of possible event signals; and command decode control means coupled to said control interface means, said control means being operative in response to said command signals to modify the contents of said registers to specify different interrupt routines and different priorities to be accorded to said event signals as required for facilitating the processing of said transfers by said processing module means.

23. A method of efficiently operating an input/output processing module coupled to a plurality of input/output control module elements, each coupled to a plurality of device, said each control module being operative to receive event signals from said devices during data transfer operations between said devices and a memory module, said method comprising the steps of:

classifying the number of possible event signals into a number of different priority levels by a corresponding number of codes;

storing in said control elements, codes designating those level numbers to be given by said control module to signals representative of predetermined ones of said events received from said plurality of devices associated therewith; and, transferring to said processing module as part of an interrupt request, codes designating the event signal signalled by said devices having the highest priority level switching said input/output processing module to a higher level activity operation as required by the priority level accorded to said event signal.

24. The method of claim 23 wherein said processing module includes interrupt control means for processing interrupt requests using a number of interrupt routines stored in said memory module, said method further comprising the steps of:

storing in said control elements, a plurality of constants for identifying any one of said number of interrupt routines;

generating in response to said events, type codes signals identifying the classifications of said events; and, transferring to said processing module, said type code signals and corresponding ones of said constants for specifying those interrupt routines to be used by said processing module in processing said higher level activity operation.

* * * * *

UNITED STATES PATENT OFFICE
CERTIFICATE OF CORRECTION

Patent No. 4,006,466      Dated Feb. 1, 1977

Inventor(s) Garvin Wesley Patterson, William A. Shelly, Jaime Calle and Earnest M. Monahan It is certified that error appears in the above-identified patent and that said Letters Patent are hereby corrected as shown below:

Claim 2, Column 48, Line 1, after "memory" insert --means--.

Claim 7, Column 48, Line 59, delete "the" (second occurrence) and insert --that--.

Claim 11, Column 49, Line 46, after "said" insert --highest--.

Claim 16, Column 50, line 44, delete "and" and insert --said--.

Claim 23, Column 52, Line 23, delete "device" and insert --devices--.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*